(12) United States Patent
De Souza et al.

(10) Patent No.: US 11,059,088 B2
(45) Date of Patent: *Jul. 13, 2021

(54) SYSTEMS AND METHODS FOR PROCESSING ALLOY INGOTS

(71) Applicant: ATI PROPERTIES LLC, Albany, OR (US)

(72) Inventors: Urban J. De Souza, Rochester Hills, MI (US); Robin M. Forbes Jones, Charlotte, NC (US); Richard L. Kennedy, Monroe, NC (US); Christopher M. O'Brien, Monroe, NC (US)

(73) Assignee: ATI PROPERTIES LLC, Albany, OR (US)

( * ) Notice: Subject to any disclaimer, the term of this patent is extended or adjusted under 35 U.S.C. 154(b) by 441 days.

This patent is subject to a terminal disclaimer.

(21) Appl. No.: 15/048,210

(22) Filed: Feb. 19, 2016

(65) Prior Publication Data

US 2016/0167100 A1    Jun. 16, 2016

Related U.S. Application Data

(63) Continuation of application No. 12/700,963, filed on Feb. 5, 2010, now Pat. No. 9,267,184.

(51) Int. Cl.
*B21D 31/00* (2006.01)
*B23K 9/04* (2006.01)
(Continued)

(52) U.S. Cl.
CPC ........... *B21D 31/00* (2013.01); *B22D 7/00* (2013.01); *B22D 25/02* (2013.01); *B23K 9/048* (2013.01);
(Continued)

(58) Field of Classification Search
CPC .......... B21D 31/00; B22D 7/00; B22D 25/02; B23K 9/048
See application file for complete search history.

(56) References Cited

U.S. PATENT DOCUMENTS

| 899,827 A | 9/1908 | Cutter |
| 2,191,478 A | 2/1940 | Hopkins |

(Continued)

FOREIGN PATENT DOCUMENTS

| CN | 85103156 A | 3/1986 |
| CN | 101195871 A | 6/2006 |

(Continued)

OTHER PUBLICATIONS

The Iron and Steel Institute of Japan (ISIJ), Steel Enchiridion, Maruzen Co., Ltd., 3rd edition, vol. III(2), Nov. 20, 1980.
(Continued)

*Primary Examiner* — Guinever S Gregorio
(74) *Attorney, Agent, or Firm* — Robert J. Toth; K&L Gates LLP

(57) ABSTRACT

Processes and methods related to processing and hot working alloy ingots are disclosed. A metallic material layer is deposited onto at least a region of a surface of an alloy ingot before hot working the alloy ingot. The processes and methods are characterized by a reduction in the incidence of surface cracking of the alloy ingot during hot working.

21 Claims, 22 Drawing Sheets

(51) Int. Cl.

| | |
|---|---|
| *B23K 35/30* | (2006.01) |
| *C22F 1/10* | (2006.01) |
| *C21D 7/13* | (2006.01) |
| *B22D 7/00* | (2006.01) |
| *B22D 25/02* | (2006.01) |
| *C22B 9/00* | (2006.01) |
| *C22B 9/04* | (2006.01) |
| *C22B 9/18* | (2006.01) |
| *C22B 9/20* | (2006.01) |

(52) U.S. Cl.
CPC ............ *B23K 35/3033* (2013.01); *C21D 7/13* (2013.01); *C22B 9/003* (2013.01); *C22B 9/04* (2013.01); *C22B 9/18* (2013.01); *C22B 9/20* (2013.01); *C22F 1/10* (2013.01); *Y10T 428/12493* (2015.01)

(56) References Cited

U.S. PATENT DOCUMENTS

| | | |
|---|---|---|
| 2,295,702 A | 9/1942 | Wissler |
| 2,630,220 A | 3/1953 | Sejournet |
| 2,653,026 A | 9/1953 | Feltus |
| 2,706,850 A | 4/1955 | Sejournet et al. |
| 2,893,555 A | 7/1959 | Buffet et al. |
| 3,001,059 A | 9/1961 | Jones |
| 3,021,594 A | 2/1962 | Clatot et al. |
| 3,067,473 A | 12/1962 | Hopkins |
| 3,105,048 A | 9/1963 | Bobrowsky |
| 3,122,828 A | 3/1964 | Havel |
| 3,127,015 A | 3/1964 | Schieren |
| 3,181,324 A | 5/1965 | Labino |
| 3,339,271 A | 9/1967 | Durfee et al. |
| 3,390,079 A | 6/1968 | Utakoji et al. |
| 3,423,975 A | 1/1969 | Collinet |
| 3,431,597 A | 3/1969 | Nowak et al. |
| 3,446,606 A | 5/1969 | Friedrich et al. |
| 3,493,713 A | 2/1970 | Johnson |
| 3,566,661 A | 3/1971 | McCafferty et al. |
| 3,617,685 A | 11/1971 | Brill-Edwards et al. |
| 3,690,135 A | 9/1972 | Gagin et al. |
| 3,693,419 A | 9/1972 | De Pierre et al. |
| 3,752,216 A | 8/1973 | Fritsche |
| 3,814,212 A | 6/1974 | Latos |
| 3,863,325 A | 2/1975 | Gurganus et al. |
| 3,869,393 A | 3/1975 | Booker |
| 3,945,240 A | 3/1976 | Brown |
| 3,959,543 A | 5/1976 | Ellis |
| 3,979,815 A | 9/1976 | Nakanose et al. |
| 3,992,202 A | 11/1976 | Dulis et al. |
| 4,055,975 A | 11/1977 | Serfozo et al. |
| 4,060,250 A | 11/1977 | Davis et al. |
| 4,160,048 A | 7/1979 | Jaeger |
| 4,217,318 A | 8/1980 | Anderson |
| 4,226,758 A | 10/1980 | Sumira |
| 4,257,812 A | 3/1981 | Johnson et al. |
| 4,377,371 A | 3/1983 | Wisander et al. |
| 4,544,523 A | 10/1985 | McCollough et al. |
| 4,728,448 A | 3/1988 | Sliney |
| 4,744,504 A | 5/1988 | Turner |
| 4,780,484 A | 10/1988 | Schubert et al. |
| 4,843,856 A | 7/1989 | Bhowal et al. |
| 4,935,198 A | 6/1990 | Tornberg |
| 4,943,452 A | 7/1990 | Itagaki et al. |
| 4,961,991 A | 10/1990 | Howard |
| 5,052,464 A | 10/1991 | Natori |
| 5,141,566 A | 8/1992 | Kitayama et al. |
| 5,259,965 A | 11/1993 | Kishi et al. |
| 5,263,349 A | 11/1993 | Felix et al. |
| 5,298,095 A | 3/1994 | Russo et al. |
| 5,302,414 A | 4/1994 | Alkhimov et al. |
| 5,348,446 A | 9/1994 | Lee et al. |
| 5,374,323 A | 12/1994 | Kuhlman et al. |
| 5,525,779 A | 6/1996 | Santella et al. |
| 5,665,180 A | 9/1997 | Seetharaman et al. |
| 5,743,120 A | 4/1998 | Balliett |
| 5,743,121 A | 4/1998 | Miller |
| 5,783,530 A | 7/1998 | Foster et al. |
| 5,788,142 A | 8/1998 | Bigay et al. |
| 5,799,717 A | 9/1998 | Aoshima et al. |
| 5,902,762 A | 5/1999 | Mercuri et al. |
| 5,908,670 A | 6/1999 | Dunkerley et al. |
| 5,951,792 A | 9/1999 | Balbach |
| 5,981,081 A | 11/1999 | Sue |
| 5,989,487 A | 11/1999 | Yoo et al. |
| 6,006,564 A | 12/1999 | Frisby et al. |
| 6,120,624 A | 9/2000 | Vogt et al. |
| 6,154,959 A | 12/2000 | Goodwater et al. |
| 6,202,277 B1 | 3/2001 | Zahedi et al. |
| 6,269,669 B1 | 8/2001 | Matsubara et al. |
| 6,296,043 B1 | 10/2001 | Bowen et al. |
| 6,309,591 B1 | 10/2001 | Yoo et al. |
| 6,312,022 B1 | 11/2001 | Brophy, III et al. |
| 6,329,079 B1 | 12/2001 | Meyer |
| 6,330,818 B1 | 12/2001 | Jain |
| 6,418,795 B2 | 7/2002 | Im et al. |
| 6,484,790 B1 | 11/2002 | Myers et al. |
| 6,547,952 B1 | 4/2003 | Staerzl |
| 6,623,690 B1 | 9/2003 | Rizzo et al. |
| 6,753,504 B2 | 6/2004 | Keller et al. |
| 6,773,824 B2 | 8/2004 | Rizzo et al. |
| 6,774,346 B2 | 8/2004 | Clothier |
| 6,865,917 B2 | 3/2005 | Golovashchenko et al. |
| 6,933,045 B2 | 8/2005 | Tamura |
| 6,933,058 B2 | 8/2005 | Darolia et al. |
| 7,000,306 B2 | 2/2006 | Rice et al. |
| 7,108,483 B2 | 9/2006 | Segletes et al. |
| 7,114,548 B2 | 10/2006 | Forbes Jones |
| 7,172,820 B2 | 2/2007 | Darolia et al. |
| 7,178,376 B2 | 2/2007 | Bergue et al. |
| 7,188,498 B2 | 3/2007 | Browne et al. |
| 7,208,116 B2 | 4/2007 | Manning et al. |
| 7,257,981 B2 | 8/2007 | Natsui et al. |
| 7,264,888 B2 | 9/2007 | Darolia et al. |
| 7,288,328 B2 | 10/2007 | Darolia et al. |
| 7,316,057 B2 | 1/2008 | Seth |
| 7,357,958 B2 | 4/2008 | Darolia et al. |
| 7,445,434 B2 | 11/2008 | Harada et al. |
| 7,516,526 B2 | 4/2009 | Rice et al. |
| 7,611,592 B2 | 11/2009 | Davis et al. |
| 7,618,684 B2 | 11/2009 | Nesbitt |
| 7,722,330 B2 | 5/2010 | Seth |
| 7,770,427 B2 | 8/2010 | Nakahara et al. |
| 7,803,212 B2 | 9/2010 | Forbes Jones et al. |
| 7,927,085 B2 | 4/2011 | Hall et al. |
| 8,002,166 B2 | 8/2011 | Nielsen et al. |
| 8,230,899 B2 | 7/2012 | Minisandram |
| 8,303,289 B2 | 11/2012 | Goller et al. |
| 8,327,676 B2 | 12/2012 | Nishimori et al. |
| 8,327,681 B2 | 12/2012 | Davidson et al. |
| 8,376,726 B2 | 2/2013 | Goller et al. |
| 8,545,994 B2 | 10/2013 | Facchini et al. |
| 8,567,226 B2 | 10/2013 | Morales |
| 8,757,244 B2 | 6/2014 | Minisandram |
| 8,789,254 B2 | 7/2014 | Minisandram et al. |
| 9,027,374 B2 | 5/2015 | Forbes Jones et al. |
| 9,242,291 B2 | 1/2016 | Minisandram et al. |
| 9,267,184 B2 | 2/2016 | De Souza et al. |
| 9,327,342 B2 | 5/2016 | Oppenheimer et al. |
| 9,610,630 B2 | 4/2017 | Shigihara et al. |
| 2002/0005233 A1 | 1/2002 | Schirra et al. |
| 2002/0019321 A1 | 2/2002 | Balliett et al. |
| 2004/0079453 A1 | 4/2004 | Groh et al. |
| 2004/0105774 A1 | 6/2004 | Del Corso et al. |
| 2005/0044800 A1 | 3/2005 | Hall et al. |
| 2005/0273994 A1 | 12/2005 | Bergstrom et al. |
| 2006/0239852 A1 | 10/2006 | Shipton et al. |
| 2008/0070024 A1 | 3/2008 | Curran et al. |
| 2010/0236317 A1 | 9/2010 | Sigelko et al. |
| 2011/0171490 A1 | 7/2011 | Demirci et al. |
| 2011/0195269 A1* | 8/2011 | Minisandram .......... B32B 15/01 428/615 |
| 2011/0302978 A1 | 12/2011 | Oppenheimer et al. |

(56) References Cited

U.S. PATENT DOCUMENTS

| | | |
|---|---|---|
| 2012/0073693 A1 | 3/2012 | Collier et al. |
| 2013/0142686 A1 | 6/2013 | Lipetzky |
| 2014/0246165 A1 | 9/2014 | Minisandram |
| 2014/0271337 A1 | 9/2014 | Banik et al. |
| 2017/0050234 A1 | 2/2017 | Banik et al. |
| 2019/0366414 A1 | 12/2019 | De Souza et al. |

FOREIGN PATENT DOCUMENTS

| | | |
|---|---|---|
| CN | 101412066 A | 4/2009 |
| CN | 101517112 A | 8/2009 |
| CN | 101554491 A | 10/2009 |
| EP | 0128682 A1 | 12/1984 |
| EP | 386515 | 2/1990 |
| EP | 0767028 | 4/1997 |
| EP | 0969114 | 1/2000 |
| EP | 1197570 | 4/2002 |
| EP | 2286942 A1 | 2/2011 |
| GB | 684013 A | 12/1952 |
| GB | 1202080 A | 8/1970 |
| GB | 1207675 A | 10/1970 |
| GB | 1472939 | 5/1977 |
| GB | 2190319 A | 11/1987 |
| GB | 2262540 A | 6/1993 |
| JP | S48-92261 A | 11/1973 |
| JP | 52-114524 A | 9/1977 |
| JP | S52-147556 | 12/1977 |
| JP | 53-108842 A | 9/1978 |
| JP | 54-52656 A | 4/1979 |
| JP | S54-29418 B2 | 9/1979 |
| JP | S55-122661 A | 9/1980 |
| JP | 56-109128 A | 8/1981 |
| JP | S57-112923 A | 7/1982 |
| JP | S57-209736 A | 12/1982 |
| JP | S58-143012 U | 9/1983 |
| JP | S59-6724 B2 | 2/1984 |
| JP | S59-22958 Y2 | 7/1984 |
| JP | 59-179214 A | 10/1984 |
| JP | S59-227992 A | 12/1984 |
| JP | S60-47012 B2 | 10/1985 |
| JP | S60-215557 A | 10/1985 |
| JP | S61-148407 U | 9/1986 |
| JP | 61-255757 A | 11/1986 |
| JP | 61-269929 A | 11/1986 |
| JP | S62-230450 A | 10/1987 |
| JP | S64-28382 A | 1/1989 |
| JP | 1-271021 | 10/1989 |
| JP | H01-254337 A | 10/1989 |
| JP | H01-274319 | 11/1989 |
| JP | H02-104435 A | 4/1990 |
| JP | H02-107795 A | 4/1990 |
| JP | H03-90212 A | 4/1991 |
| JP | H03-174938 A | 7/1991 |
| JP | H03-277751 A | 12/1991 |
| JP | H03-297533 A | 12/1991 |
| JP | H04-13434 A | 1/1992 |
| JP | H04-66607 | 3/1992 |
| JP | 4-118133 A | 4/1992 |
| JP | H05-4994 A | 1/1993 |
| JP | H05-147975 A | 6/1993 |
| JP | H05-177289 A | 7/1993 |
| JP | 6-63743 A | 3/1994 |
| JP | H06-63638 A | 3/1994 |
| JP | H06-106232 A | 4/1994 |
| JP | H06-154842 A | 6/1994 |
| JP | H06-277748 A | 10/1994 |
| JP | H06-328125 A | 11/1994 |
| JP | H07-3840 A | 1/1995 |
| JP | H07-11403 A | 1/1995 |
| JP | H07-88586 A | 4/1995 |
| JP | H07-171650 A | 7/1995 |
| JP | H07-223018 A | 8/1995 |
| JP | H09-271981 A | 10/1997 |
| JP | 11-10222 A | 1/1999 |
| JP | 2000-288674 A | 10/2000 |
| JP | 2000-312905 A | 11/2000 |
| JP | 2002-299019 A | 10/2002 |
| JP | 2003-239025 A | 8/2003 |
| JP | 2003-260535 A | 9/2003 |
| JP | 2004-67426 A | 3/2004 |
| JP | 2005-40810 A | 2/2005 |
| JP | 2005-66656 A | 3/2005 |
| JP | 2007-54867 A | 3/2007 |
| JP | 2009-66661 A | 4/2009 |
| JP | 11-320073 | 11/2009 |
| JP | 2010-519 A | 1/2010 |
| JP | 2010-65135 A | 3/2010 |
| JP | 2013-119100 A | 6/2013 |
| RU | 2020020 C1 | 9/1994 |
| RU | 2070461 C1 | 12/1996 |
| RU | 2133652 C1 | 7/1999 |
| RU | 2145981 C1 | 2/2000 |
| RU | 2145982 C1 | 2/2000 |
| RU | 2275997 C2 | 5/2006 |
| RU | 2337158 C2 | 10/2008 |
| RU | 2355791 C2 | 5/2009 |
| RU | 2415967 C2 | 4/2011 |
| SU | 435288 A1 | 7/1974 |
| SU | 1015951 A1 | 5/1983 |
| SU | 1076162 A1 | 2/1984 |
| SU | 1299985 A1 | 3/1987 |
| SU | 1540977 A1 | 2/1990 |
| SU | 1606252 A1 | 11/1990 |
| SU | 1761364 A1 | 9/1992 |
| TW | 562714 B | 11/2003 |
| WO | WO 92/07050 A1 | 4/1992 |
| WO | WO 94/13849 A1 | 6/1994 |
| WO | WO 1995/35396 | 12/1995 |
| WO | WO 98/05463 A1 | 2/1998 |
| WO | WO 99/02743 A1 | 1/1999 |
| WO | WO 2001/012381 | 2/2001 |
| WO | WO 02/27067 A1 | 4/2002 |
| WO | WO 2007/098439 A1 | 8/2007 |

OTHER PUBLICATIONS

U.S. Appl. No. 15/143,693, filed May 2, 2016.

Atlan et al., Metal Forming: Fundamentals and Applications, Ch. 6. Friction in Metal Forming, ASM: 1983.

Donachie et al., Superalloys: A Technical Guide, Melting and Conversion, pp. 56-77, ASM International, 2002.

Paton et al., ESS LM as a way for heavy ingot manufacturing, LMPC, 2007.

ASTM E2465-06 (2006): Standard Test Method for Analysis of Ni-Base Alloys by X-ray Fluorescence Spectrometry.

ASTM E1019-08 (2008): Standard Test Methods for Determination of Carbon, Sulfur, Nitrogen, and Oxygen in Steel, Iron, Nickel, and Cobalt Alloys by Various Combustion and Fusion Techniques.

Santella, An overview of the welding of Ni3Al and Fe3Al alloys, ASME and ASM Materials Conference, Dec. 31, 1996.

Levin et al., Robotic weld overlay coatings for erosion control, Quarterly Technical Progress Report for U.S. DOE Grant No. DE-FG22-92PS92542, Lehigh University, Energy Research Center, Apr. 25, 1995.

Maziasz et al., Overview of the development of FeAl intermetallic alloys, Proceedings of the 2d International Conference on Heat-Resistant Materials, Sep. 1, 1995.

Ito et al., Blast erosion properties of overlay weld metal, Welding International, 5:3, 1991, pp. 192-197.

Horn et al., Auftragschweißungen mit Hastelloy alloy B-42 (Overlay welding with Hastelloy B-42), Materials and Corrosion, 43:8, 1992, pp. 381-387.

Tillack, Weld fabrication of nickel-containing materials, Practical handbook of stainless steels & nickel alloys, Lamb ed., CASTI Publishing Inc., ASM International, Aug. 1999, pp. 325-370.

Insulating Method Improves Superalloy Forging, Baosteel Technical Research, Apr. 23, 2012, vol. 5, No. 4, 2 pages.

ITC-100, ITC-200, ITC-213 Ceramic Coatings, BCS International Technical Ceramics Coatings, http://budgetcastingsupply.com/ITC.php, Feb. 2013, 3 pages.

(56) References Cited

OTHER PUBLICATIONS

ITC-100 Base Coat, ITC-296A Top Coat, Coatings, http://budgetcastingsupply.com/ITC-Wool, 2013.
Carbon Steel, E-Z LOK, AISI 12L14 Steel, cold drawn, 19-38 mm round, Aug. 5, 2013, http://www.ezlok.com/TechnicalInfo/MPCarbonSteel.html, 1 page.
Alloy 309/309S, Specification Sheet: Alloy 309, Sandmeyer Steel Company, Aug. 5, 2013, http://www.sandmeyersteel.com/309-309S.html, 4 pages.
Shivpuri, R. and S. Kini, Lubricants and Their Applications in Forging, ASM Handbook, vol. 14A, Metalworking: Bulk Forming, Semiatin, S.L., ed., 2005, ASM International, Ohio, US, p. 84.
Schey et al., Laboratory Testing of Glass Lubricants, Lubrication Engineering/Tribology and Lubrication Technology, Society of Tribologists and Lubrication Engineers, US, vol. 30, No. 10, Oct. 1, 1974, pp. 489-497.
McGraw Hill Encyclopedia of Science and Technology, 1992, McGraw Hill Inc., vol. 11, pp. 32-33.
Chesney, Peter, A New Spray Coating Process for Manufacture of Stainless Steel Clad Construction Steel with Resistance to Corrosion by De-icing Salts & Seawater, Spray Forming International, Cayce, South Carolina, USA, Thermal Spray 2003: Advancing the Science and Applying the Technology, ASM International, 2003, 5 pages.
Anchor Industrial Sales, Inc. Product Data Sheets, Style #412 Fiberglass cloth, Style #412IB Fiberglass Mats, 2008, 2 pages.
"A New Nickel Superalloy", Machine Design, Hayes International Inc., published by Penton Publishing, Mar. 23, 2006, p. 41.
Crucible Compaction Metals P/M Low Carbon Astroloy, Supersolvus, printed from http://www/matweb.com/search/datasheet_print.aspx?matguid=e1bac255c1964e19a43b29 . . . On Aug. 17, 2011, 2 pages.
Gayda, John, "NASA/TM-2001-210814 High Temperature Fatigue Crack Growth Behavior of Alloy 10", Glenn Research Center, Cleveland, Ohio, National Aeronautics and Space Administration, Apr. 2001, 7 pages.
Advanced Solutions for Higher Performance and Longer Life, ATI Powder Metals Applications, printed from http://www.alleghenytechnologies.com/atipowder/applications/default.asp on Sep. 22, 2011, 4 pages.
Wlodek et al., "The Structure of Rene' 88 DT", Superalloys 1996, Eds. Kissinger et al., The Minerals, Metals & Materials Society, 1996, pp. 129-136.
Zielinska et al., "Thermal properties of cast nickel based superalloys", Archives of Materials Science and Engineering, vol. 44, Issue 1, Jul. 2010, pp. 35-38.
Charpy V-Notch Impact Testing, History and Process, Laboratory Testing, Inc., 2 pages.
Rockwell Hardness Testing, Materials Evaluation and Engineering, Inc., 2009, 2 pages.
Belfort, M.G. and V.E. Patton, "Equipment for arc and slag welding and weld deposition", Moscow, High School, 1974.
Steel Handbook, 3rd Edition, Bar Steel/Steel Tube/Rolling Common Equipment, Edited by Iron and Steel Inst. of Japan, Nov. 20, 1980.
Steel Enchiridion, The Iron and Steel Institute of Japan (ISIJ), Japan, Maruzen Co. Ltd., Nov. 20, 1980, 3rd Edition, vol. 3 (2), pp. 1013-1037.
High Temperature Glass Forging Lubricants for Super and Titanium Alloys, Advanced Technical Products Supply Co., Inc., accessed Nov. 5, 2017. http://www/advancedtechnicalpro.com/high-temperature-glass-forging-lubricants.html.
High Temperature Glass Forging Lubricants for Super and Titanium Alloys, Advanced Technical Products Supply Co., Inc., Cincinnati, Ohio, page as available on Internet on Oct. 2017, accessed on web.archive.org, 2 pages.
Advanced Technical Products Supply Co., Inc., Cincinnati, Ohio, page as available on Internet on Oct. 2017, accessed on web.archive.org, 1 page.
Shinmura, Izuru, Ed., Kojien, 5th Edition, Iwanami Iwanami Shoten Publishers, Nov. 11, 1998, p. 1821.

* cited by examiner

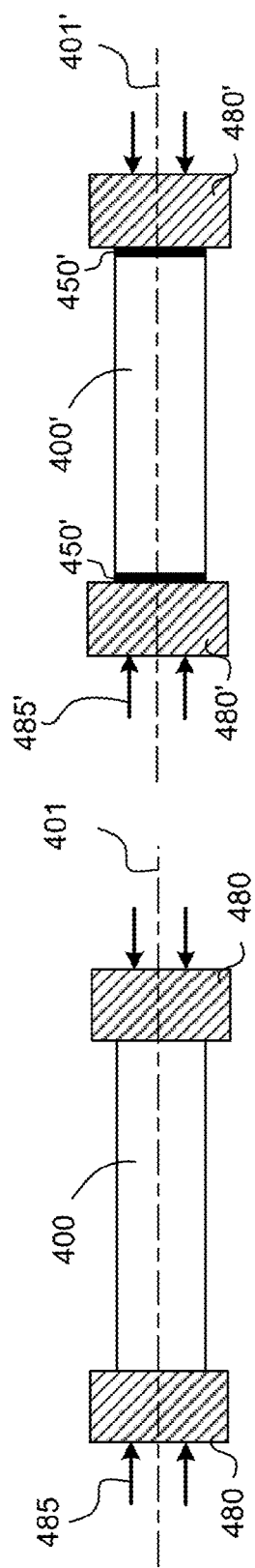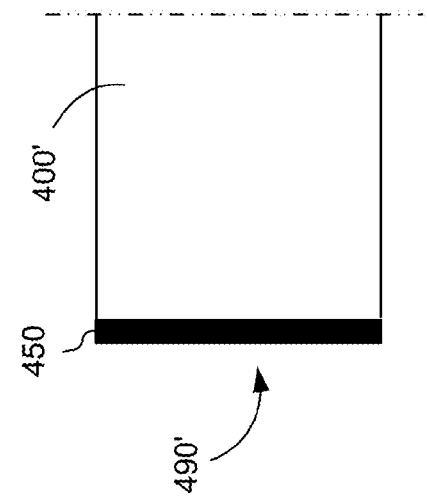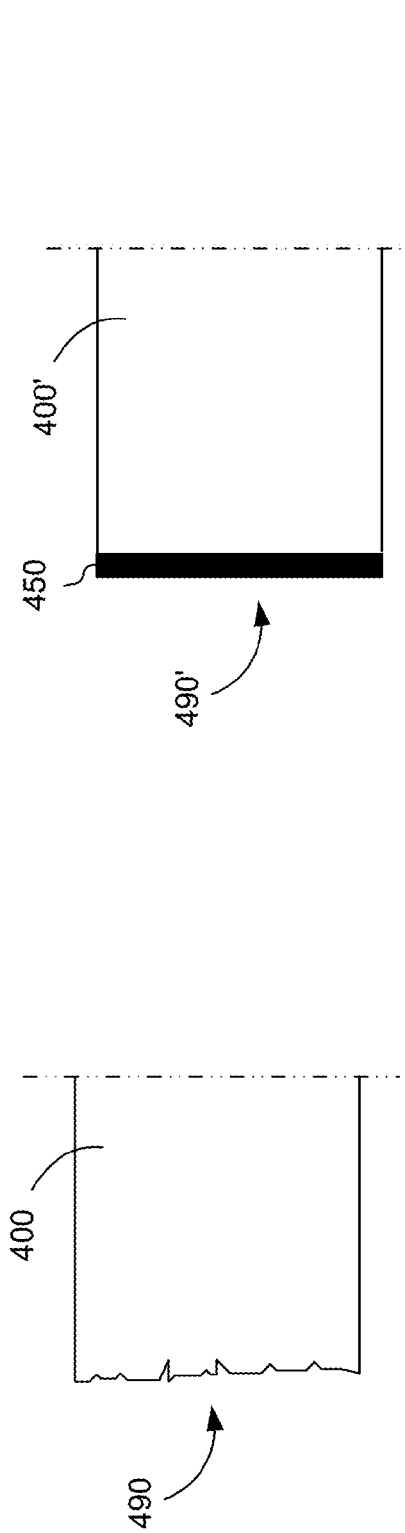

SYSTEMS AND METHODS FOR PROCESSING ALLOY INGOTS

CROSS-REFERENCE TO RELATED APPLICATIONS

This patent application is a continuation application and claims the benefit of the filing date under 35 U.S.C. § 120 of co-pending U.S. patent application Ser. No. 12/700,963, filed on Feb. 5, 2010, which issued on Feb. 23, 2016 as U.S. Pat. No. 9,267,184. U.S. patent application Ser. No. 12/700,963 is incorporated by reference into this specification.

TECHNICAL FIELD

The present disclosure is directed to systems and methods for processing alloy ingots. The present disclosure is also directed to processes for hot working alloy ingots.

BACKGROUND

Metal alloy products may be prepared, for example, using ingot metallurgy operations or powder metallurgy operations. Ingot metallurgy operations may involve the melting of an alloy feedstock and the casting of the molten material into an ingot. A non-limiting example of an ingot metallurgy operation is a "triple melt" technique, which includes three melting operations: (1) vacuum induction melting (VIM) to prepare a desired alloy composition from a feedstock; (2) electroslag refining (ESR), which may reduce levels of, for example, oxygen-containing inclusions; and (3) vacuum arc remelting (VAR), which may reduce compositional segregation that may occur during solidification after ESR. An ingot may be formed during solidification after a VAR operation.

Powder metallurgy operations may involve atomization of molten alloy and the collection and consolidation of solidified metallurgical powders into an ingot. A non-limiting example of a powder metallurgy operation includes the steps of: (1) VIM to prepare a desired alloy composition from a feedstock; (2) atomization of molten alloy into molten alloy droplets that solidify into alloy powder; (3) optionally, sieving to reduce inclusions; (4) canning and degassing; and (5) pressing to consolidate the alloy powder into an alloy ingot.

The alloy ingots formed from ingot metallurgy operations and powder metallurgy operations may be hot worked to produce other alloy products. For example, after solidification or consolidation to form an alloy ingot, the ingot may undergo forging and/or extrusion to form a billet or other alloy article from the ingot.

SUMMARY

Embodiments disclosed herein are directed to an ingot processing method. An ingot processing method may comprise depositing a metallic material layer onto at least a region of a surface of an alloy ingot. The ingot processing method may be characterized in that the metallic material layer reduces an incidence of surface cracking of the alloy ingot during hot working.

Other embodiments disclosed herein are directed to a hot working process. The hot working process may comprise applying force to an alloy ingot to deform the alloy ingot. The alloy ingot may include a metallic material layer deposited onto at least a region of a surface of the alloy ingot. The hot working process may be characterized in that the force is applied onto the metallic material layer.

Other embodiments disclosed herein are directed to ingot processing systems. An ingot processing system may comprise an ingot positioning apparatus. The ingot positioning apparatus may be configured to rotate an ingot about a long axis of the ingot. The ingot processing system may also comprise a welding apparatus. The welding apparatus may be configured to deposit a metallic material layer as a weld deposit onto at least a region of a surface of an ingot.

It is understood that the invention disclosed and described herein is not limited to the embodiments disclosed in this Summary.

BRIEF DESCRIPTION OF THE DRAWINGS

Various characteristics of the non-limiting embodiments disclosed and described herein may be better understood by reference to the accompanying figures, in which:

FIG. 7A is a side cross-sectional view of an ingot in an upset forging operation, FIG. 7B is an expanded partial side cross-sectional view of the ingot shown in FIG. 7A after upset forging, FIG. 7C is a side cross-sectional view of an ingot in an upset forging operation and having a metallic material layer deposited onto the end surfaces of the ingot, and FIG. 7D is an expanded partial side cross-sectional view of the ingot shown in FIG. 7C after upset forging;

Figure 1A:
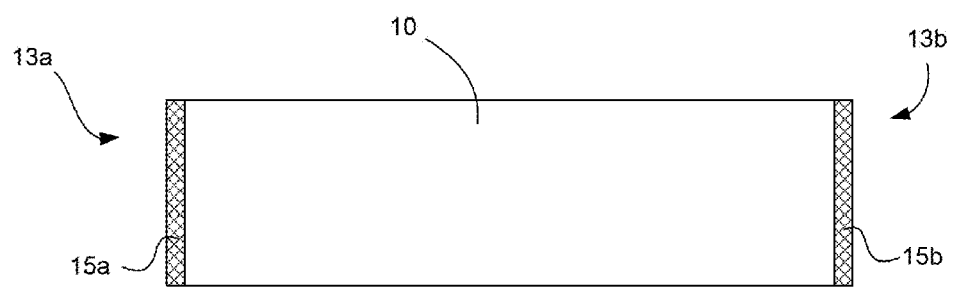
FIG. 1A is a side view of an ingot having a metallic material layer deposited onto the end surfaces of the ingot.

The reader will appreciate the foregoing details, as well as others, upon considering the following detailed description of various non-limiting embodiments according to the present disclosure. The read may also comprehend additional details upon implementing or using embodiments described herein.

DETAILED DESCRIPTION OF NON-LIMITING EMBODIMENTS

It is to be understood that various descriptions of the disclosed embodiments have been simplified to illustrate only those features, aspects, characteristics, and the like that are relevant to a clear understanding of the disclosed embodiments, while eliminating, for purposes of clarity, other features, aspects, characteristics, and the like. Persons having ordinary skill in the art, upon considering the present description of the disclosed embodiments, will recognize that other features, aspects, characteristics, and the like may be desirable in a particular implementation or application of the disclosed embodiments. However, because such other features, aspects, characteristics, and the like may be readily ascertained and implemented by persons having ordinary skill in the art upon considering the present description of the disclosed embodiments, and are, therefore, not necessary for a complete understanding of the disclosed embodiments, a description of such features, aspects, characteristics, and the like is not provided herein. As such, it is to be understood that the description set forth herein is merely exemplary and illustrative of the disclosed embodiments and is not intended to limit the scope of the invention as defined solely by the claims.

In the present disclosure, other than where otherwise indicated, all numbers expressing quantities or characteristics are to be understood as being prefaced and modified in all instances by the term "about." Accordingly, unless indicated to the contrary, any numerical parameters set forth in the following description may vary depending on the desired properties one seeks to obtain in the embodiments according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Any maximum numerical limitation recited herein is intended to include all lower numerical limitations subsumed therein and any minimum numerical limitation recited herein is intended to include all higher numerical limitations subsumed therein. Accordingly, Applicants reserve the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of 35 U.S.C. § 112, first paragraph, and 35 U.S.C. § 132(a).

The grammatical articles "one", "a", "an", and "the", as used herein, are intended to include "at least one" or "one or more", unless otherwise indicated. Thus, the articles are used herein to refer to one or more than one (i.e., to at least one) of the grammatical objects of the article. By way of example, "a component" means one or more components, and thus, possibly, more than one component is contemplated and may be employed or used in an implementation of the described embodiments.

Any patent, publication, or other disclosure material that is said to be incorporated by reference herein, is incorporated herein in its entirety unless otherwise indicated, but only to the extent that the incorporated material does not conflict with existing definitions, statements, or other disclosure material expressly set forth in this disclosure. As such, and to the extent necessary, the express disclosure as set forth herein supersedes any conflicting material incorporated by reference herein. Any material, or portion thereof, that is said to be incorporated by reference herein, but which conflicts with existing definitions, statements, or other disclosure material set forth herein is only incorporated to the extent that no conflict arises between that incorporated material and the existing disclosure material. Applicants reverse the right to amend the present disclosure to expressly recite any subject matter, or portion thereof, incorporated by reference herein.

The present disclosure includes descriptions of various embodiments. It is to be understood that all embodiments described herein are exemplary, illustrative, and non-limiting. Thus, the invention is not limited by the description of the various exemplary, illustrative, and non-limiting embodiments. Rather, the invention is defined solely by the claims, which may be amended to recite any features expressly or inherently described in or otherwise expressly or inherently supported by the present disclosure. Therefore, any such amendments would comply with the requirements of 35 U.S.C. § 112, first paragraph, and 35 U.S.C. § 132(a).

The various embodiments disclosed and described herein can comprise, consist of, or consist essentially of, the features, aspects, characteristics, and the like, as variously described herein. The various embodiments disclosed and described herein can also comprise additional or optional features, aspects, characteristics, and the like, that are known in the art or that may otherwise be included in various embodiments as implemented in practice.

Various alloys may be characterized as crack sensitive. Crack sensitive alloys tend to form cracks during working operations. Crack sensitive alloy ingots, for example, may form cracks during hot working operations used to produce alloy articles from the crack sensitive alloy ingots. For example, alloy billets may be formed from alloy ingots using forge conversion. Other alloy articles may be formed from alloy billets or alloy ingots using extrusion or other working operations. The production yield of alloy articles (e.g., alloy billets) formed from crack sensitive alloy ingots using hot working operations may be low because of the incidence of surface cracking of the alloy ingots during the hot working (e.g., during forging or extrusion).

As used herein, the term "hot working" refers to the application of force to a workpiece at a temperature greater than ambient temperature, wherein the applied force deforms the workpiece.

During hot working operations, such as, for example, forging or extrusion, the temperature of an alloy ingot undergoing the working operation may be greater than the temperature of the dies used to mechanically apply force to the surfaces of the ingot. The resulting thermal gradient off-set between the ingot surfaces and the contacting dies may contribute to surface cracking of the ingot during hot working, particularly for ingots formed from crack sensitive alloys, such as, for example, nickel base, iron base, nickel-iron base, and cobalt base alloys and superalloys.

Embodiments disclosed herein are directed to ingot processing methods and hot working processes characterized by a reduction in the incidence of surface cracking of an alloy ingot during a hot working operation. In various embodiments, the described methods and/or processes may comprise depositing a metallic material layer onto at least a region of a surface of an alloy ingot. The alloy, ingot may be hot worked by applying a force to the alloy ingot at the region of the surface having the deposited metallic material layer. The applied force may deform the alloy ingot.

In various embodiments, the alloy ingot may comprise a crack sensitive alloy. For example, various nickel base, iron base, nickel-iron base, and cobalt base alloys and superalloys may be crack sensitive, especially during hot working operations. An alloy ingot may be formed from such crack sensitive alloys and superalloys. A crack sensitive alloy ingot may be formed from alloys or superalloys including, but not limited to, Alloy 718, Alloy 720, Rene 41™ alloy, Rene 88™ alloy, Waspaloy® alloy, and Inconel® 100. The methods, processes, and systems described herein are generally applicable to any alloy characterized by a relatively low ductility at hot working temperatures. As used herein the term "alloy" includes conventional alloys and superalloys, wherein superalloys exhibit relatively good surface stability, corrosion and oxidation resistance, high strength, and high creep resistance at high temperatures.

An alloy ingot may be formed using an ingot metallurgy operation or a powder metallurgy operation. For example, in various embodiments, an alloy ingot may be formed by VIM followed by VAR (a VIM-VAR operation). In various embodiments, an alloy ingot may be formed by triple melting in which an ESR operation is performed intermediate a VIM operation and a VAR operation (a VIM-ESR-VAR operation). In other embodiments, an alloy ingot may be formed using a powder metallurgy operation involving atomization of molten alloy and the collection and consolidation of resulting metallurgical powders into an ingot.

In various embodiments, an alloy ingot may be formed using a spray forming operation. For example, VIM may be used to prepare a base alloy composition from a feedstock. An ESR operation may optionally be used after VIM. Molten alloy may be extracted from a VIM or ESR melt pool and atomized to form molten droplets. The molten alloy may be extracted from a melt pool using a cold wall induction guide (CIG), for example. The molten alloy droplets may be deposited using a spray forming operation to form a solidified ingot.

After initial ingot formation, but before deposition of a metallic material layer onto an ingot and subsequent hot working of the ingot, an alloy ingot may be heat treated and/or surface conditioned. For example, in various embodiments, an alloy ingot may be exposed to high temperatures to homogenize the alloy composition and microstructure of the ingot. The high temperatures may be above the recrystallization temperature of the alloy but below the melting point temperature of the alloy.

An alloy ingot may be surface conditioned, for example, by grinding or peeling the surface of the ingot. An alloy ingot may also be sanded and/or buffed. Surface conditioning operations may be performed before and/or after any optional heat treatment steps, such as, for example, homogenization at high temperatures.

In various embodiments, a metallic material layer may be deposited and metallurgically bonded to at least a region of a surface of an alloy ingot. For example, a metallic material layer may be deposited as a weld deposit onto a surface of an ingot. A weld deposit may be metallurgically bonded to at least a region of a surface of an alloy ingot using welding operations including, but not limited to, metal inert gas (MIG) welding, tungsten insert gas (TIG) welding, plasma welding, submerged arc welding, and electron-beam welding.

The metallic material layer may comprise a metallic material that is more ductile and/or malleable than the alloy of the underlying ingot at the particular working temperature to be used. The metallic material layer may comprise a metallic material that exhibits greater toughness and/or lesser hardness than the alloy of the underlying ingot at the particular working temperature to be used. In various embodiments, the metallic material layer insulates the underlying ingot surface from the surfaces of contacting dies, thereby preventing the underlying ingot surface from cooling to a brittle temperature at which the surface may more readily crack during hot working.

The metallic material layer may comprise a metallic material that is oxidation resistant. In various embodiments, the metallic material layer does not oxidize during hot working or otherwise. The metallic material layer may comprise a metallic material exhibiting a relatively high stiffness (e.g., a relatively low elastic modulus). In various embodiments, the metallic material layer does not thin out substantially during hot working (e.g., where the application of force by one or more dies would cause a relatively low stiffness metallic material to thin out on the underlying ingot surface).

In various embodiments, the metallic material and the alloy forming the underlying ingot may comprise the same base metal. For example, if the alloy ingot comprises a nickel base alloy or superalloy (e.g., Alloy 720, Rene 88™ alloy, or Waspaloy® alloy), then the metallic material of the deposited layer may also comprise a nickel base alloy, such as, for example, a nickel base weld alloy (e.g., Techalloy 606™ alloy (available from Techalloy Company/Central Wire)).

The metallic material layer may be deposited to a thickness sufficient to insulate the underlying ingot surface from the surfaces of contacting dies, thereby preventing the underlying ingot surface from cooling to a temperature at which the underlying surface may more readily crack during hot working. In this manner, greater hot working temperatures may generally correlate with greater metallic material layer thicknesses. In various embodiments, the metallic material layer may be deposited to a thickness of 0.25 inches to 0.5 inches onto at least a region of a surface of an alloy ingot.

The temperature range over which alloys can be effectively hot worked is based on the temperature at which cracks initiate in the alloy. At a given starting temperature for a hot working operation, some alloys can be effectively hot worked over a larger temperature range than other alloys because of differences in the temperature at which cracks initiate in the alloy. For alloys having a relatively small hot working temperature range (i.e., the difference between the starting temperature and the temperature at which cracks initiate), the thickness of the metallic material layer may need to be relatively greater to prevent the underlying ingot from cooling down to a brittle temperature range in which cracks initiate. Likewise, for alloys having a relatively large hot working temperature range, the thickness of the metallic material layer may be relatively smaller to and still prevent the underlying ingot from cooling down to a brittle temperature range in which cracks initiate.

Figure 1B:
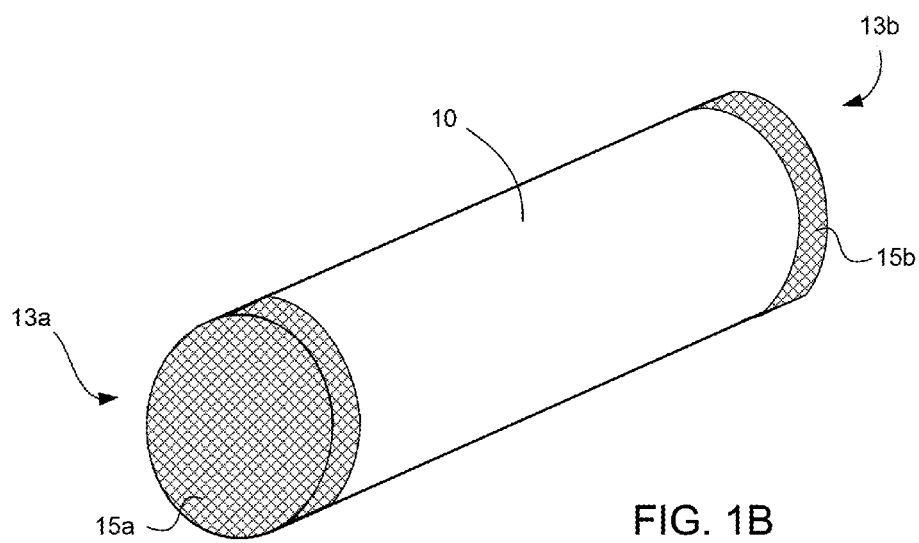
FIG. 1B is a perspective view of the ingot shown in FIG. 1A.

In various embodiments, the metallic material layer may be deposited onto at least one end of an alloy ingot. FIGS. 1A and 1B illustrate an elongated alloy ingot 10 having opposed ends 13a and 13b. Metallic material layers 15a and 15b are deposited onto the ends 13a and 13b of the alloy ingot 10. Although FIGS. 1A and 1B show metallic material layers on both ends 13a and 13b of the ingot 10, in various embodiments a metallic material layer may be deposited onto only one end of an elongated alloy ingot and the other, opposed end may not have a deposited metallic material layer. Although FIGS. 1A and 1B show metallic material layers fully covering the ends of the ingot 10, in various embodiments a metallic material layer may be deposited onto only a portion or region of one or both of the opposed end surfaces of an elongated alloy ingot. In various embodiments, the metallic material may be more ductile than the alloy of the ingot.

Figure 2:
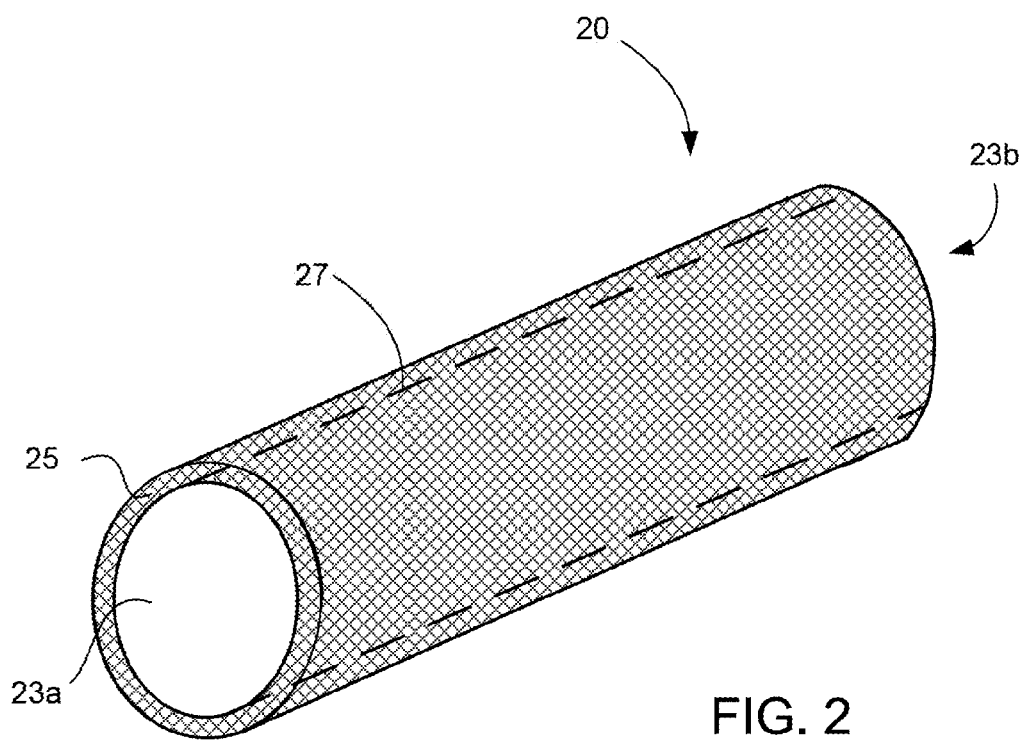
FIG. 2 is a perspective view of an ingot having a metallic material layer deposited onto a circumferential surface of the ingot.

The metallic material layer may be deposited onto at least a region of a circumferential surface of a cylindrical alloy ingot. FIG. 2 illustrates an alloy ingot 20 having opposed ends 23a and 23b and a circumferential surface 27 (indicated by dashed lines). A metallic material layer 25 is deposited onto the circumferential surface 27 of the alloy ingot 20. Although FIG. 2 shows the metallic material layer fully covering the circumferential surface 27, in various embodiments a metallic material layer may be deposited onto only a portion or region of a circumferential surface of a cylindrical alloy ingot.

Figure 3A:
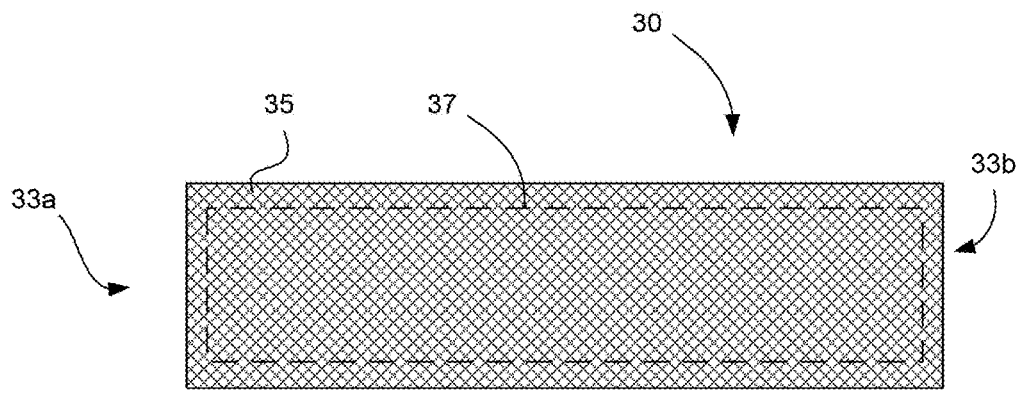
FIG. 3A is a side view of an ingot having a metallic material layer deposited onto the end surfaces and a circumferential surface of the ingot.
Figure 3B:
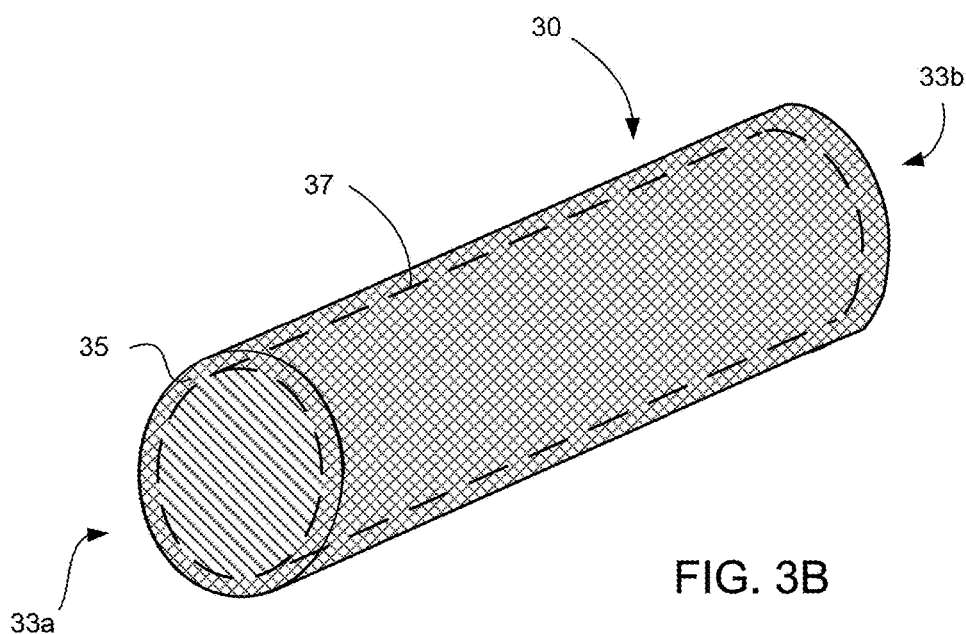
FIG. 3B is a perspective view of the ingot shown in FIG. 3A.

FIGS. 3A and 3B illustrate an alloy ingot 30 having opposed ends 33a and 33b and a circumferential surface 37 (indicated by dashed lines). Metallic material layer 35 is deposited onto the circumferential surface 37 and the ends 33a and 33b of the alloy ingot 30. In this manner, the alloy ingot 30 is entirely covered with a deposited metallic material layer 35. The surfaces of the underlying ingot are shown as dashed lines in FIGS. 3A and 3B. Although FIGS. 3A and 3B show metallic material layers fully covering the ends and the circumferential surface of the ingot 30, in various embodiments, a metallic material layer also may be deposited onto only portions or regions of one or both of the opposed end surfaces and/or the circumferential surface of an elongated cylindrical alloy ingot.

In various embodiments, a metallic material layer may be deposited as a weld deposit onto at least a region of a surface of an alloy ingot by rotating the ingot about a long axis of the ingot and depositing the metallic material as a weld deposit onto a first region of a circumferential surface of the rotating ingot. The metallic material layer may be deposited using at least one stationary welding torch. The welding torch may deposit the metallic material onto the surface of the ingot as the ingot rotates and the surface passes beneath the torch. In this manner, a ring-shaped layer of metallic material may be deposited onto a first region of the circumferential surface of the cylindrical ingot as the ingot proceeds through at least one rotation.

After a rotating ingot proceeds through at least one rotation, and a ring-shaped layer of metallic material is deposited onto a region of the circumferential surface of the ingot, at least one welding torch may be re-positioned to a location adjacent to the deposited ring-shaped layer of the metallic material. The re-positioning may be performed by moving at least one welding torch relative to the ingot, and/or moving the ingot relative to the at least one welding torch. A re-positioned welding torch may then deposit additional metallic material as a weld deposit onto a second or subsequent region of the circumferential surface of the rotating ingot. In this manner, a second or subsequent ring-shaped metallic material layer may be formed adjacent to a previously deposited ring-shaped metallic material layer. In various embodiments, ring-shaped layers of metallic material may be successively formed adjacent to each other and in contact with each other so that the metallic material layers collectively form a continuous layer covering at least a region of a circumferential surface of a cylindrical ingot.

The re-positioning of at least one welding torch and the depositing of a ring-shaped layer of metallic material may be repeated successively until the circumferential surface of the alloy ingot is substantially covered with a continuous metallic material layer. In various embodiments, welding operation parameters, welding torch positioning, and ingot positioning may be predetermined and/or actively controlled to form a uniform metallic material layer over at least a region of a surface of an alloy ingot.

Figure 4A:
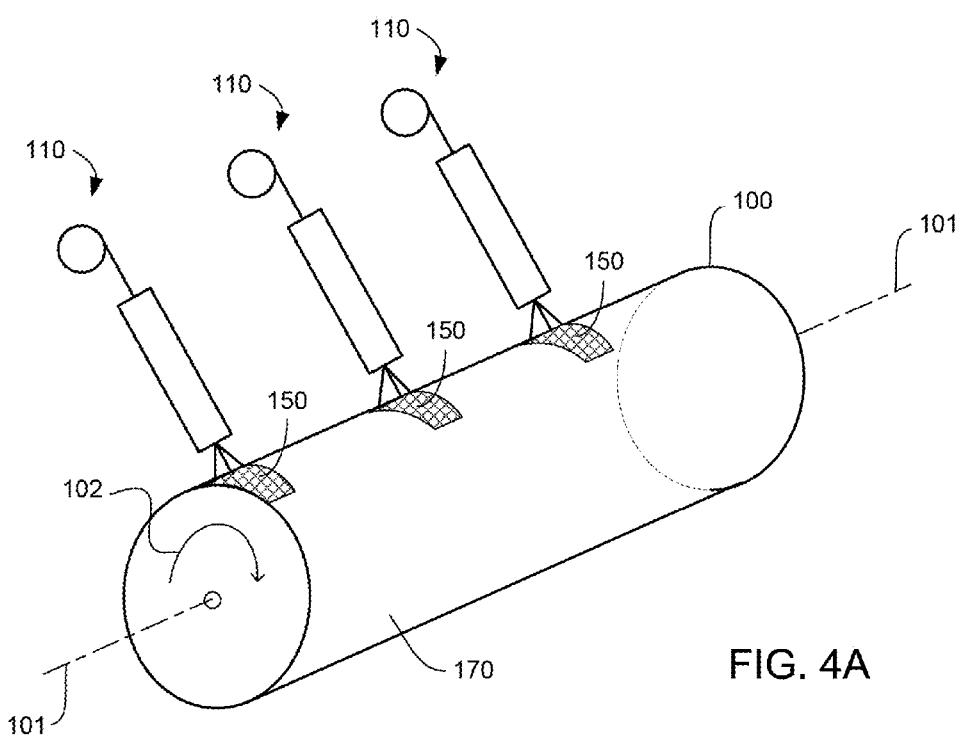
FIGS. 4A-4D are perspective views illustrating one method of depositing metallic material as weld deposits onto a circumferential surface of an ingot.
Figure 4B:
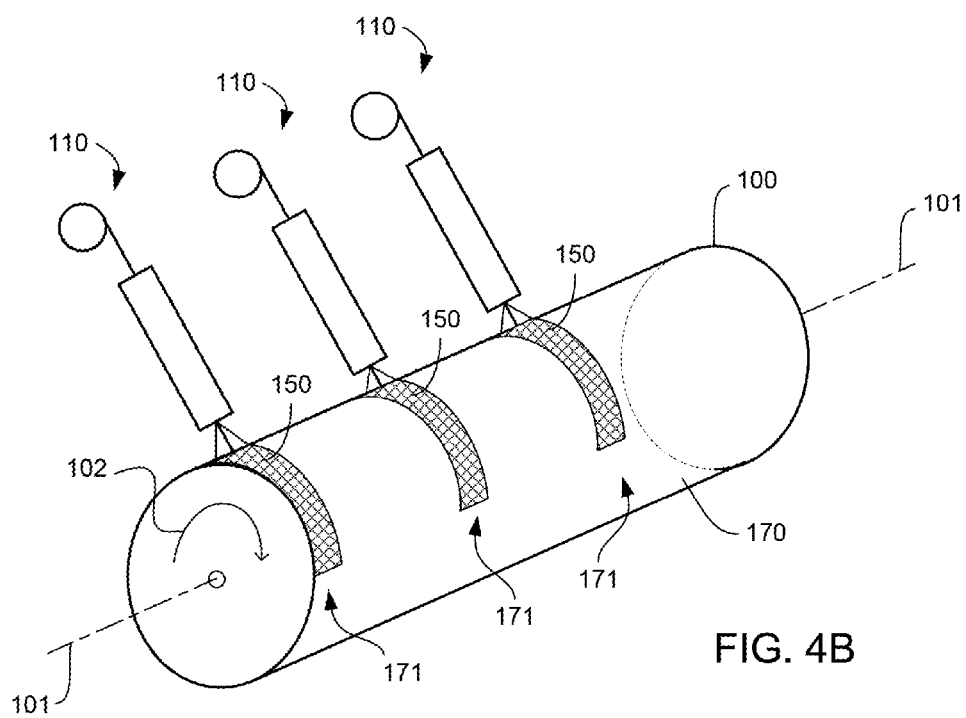
Figure 4C:
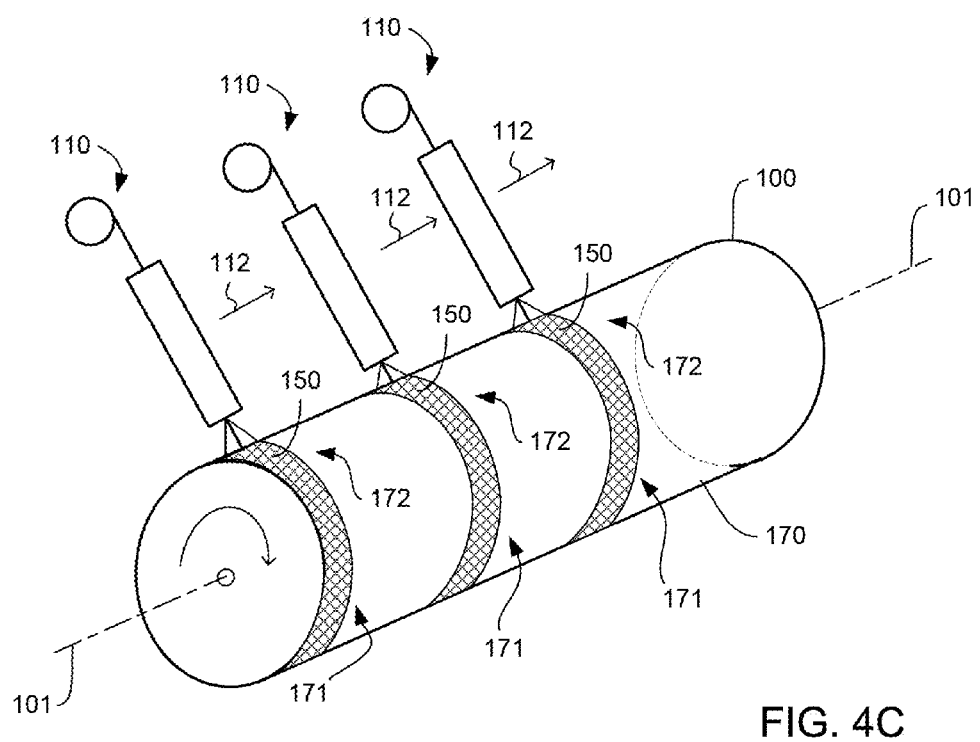

FIGS. 4A-4D collectively illustrate an embodiment of the deposition of metallic material as weld deposits onto at least a region of a surface of an alloy ingot. Alloy ingot 100 rotates about long axis 101 as indicated by arrow 102. Welding torches 110 remain stationary and deposit metallic material 150 onto the circumferential surface 170 of the ingot 100 as the ingot 100 rotates about long axis 101. The metallic material 150 may be more ductile and/or malleable than the alloy of the alloy ingot 100 when the ingot is at a temperature at which the ingot 100 is worked. The welding torches 110 deposit metallic material 150 onto first regions 171 of the circumferential surface 170 of the ingot 100 as the circumferential surface 170 passes beneath the welding torches 110. The welding torches 110 remain stationary until the ingot 100 proceeds through at least one rotation, and ring-shaped layers of metallic material 150 are deposited onto the first regions 171 of the circumferential surface 170 of the ingot 100 (FIG. 4C).

Figure 4D:
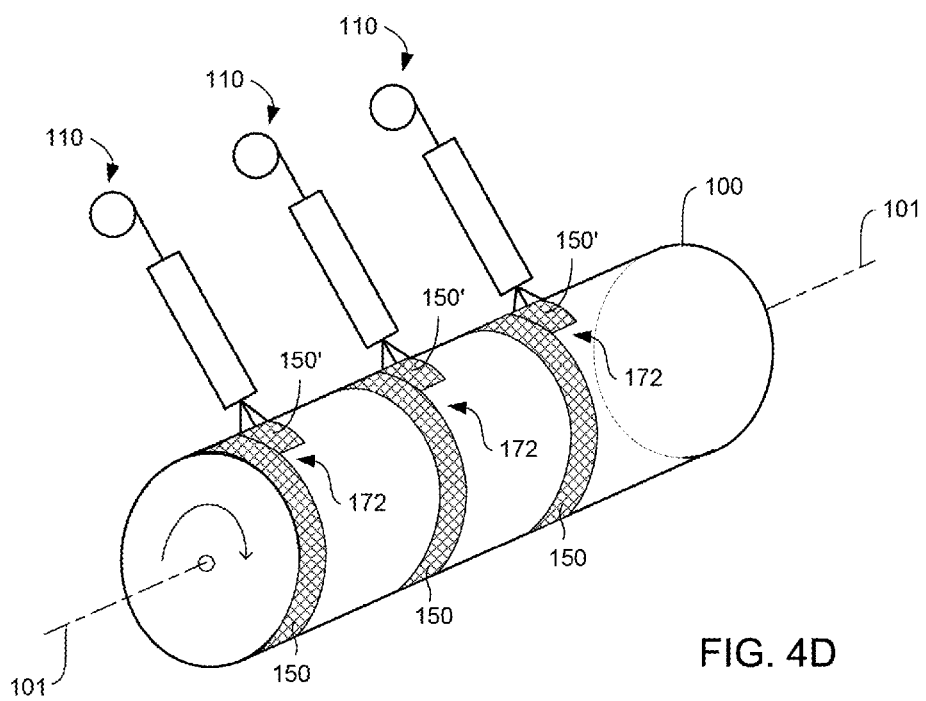

As shown in FIG. 4C, after the ring-shaped layers of metallic material 150 are deposited onto the first regions 171 of the circumferential surface 170 of the ingot 100 by rotating ingot 100 through at least one rotation, the welding torches 110 are re-positioned by moving the torches a distance in a direction parallel to the long axis 101 of the ingot 100, as indicated by arrows 112 in FIG. 4C. The welding torches 110 are re-positioned so that the welding torches 110 are located adjacent to the first regions 171 and, therefore, adjacent to the ring-shaped layers of metallic material 150 already deposited (FIG. 4D). Although FIG. 4C illustrates re-positioning the welding torches 110 by moving the welding torches 110 parallel to long axis 101, the position of the welding torches 110 relative to the ingot 100 also may be changed by moving the ingot 100 parallel to long axis 101.

As shown in FIG. 4D, the re-positioned welding torches 110 deposit additional metallic material 150' as weld deposits onto second regions 172 of the circumferential surface 170 of the ingot 100 as the ingot 100 rotates about long axis 101. In this manner, second ring-shaped layers of metallic material 150' are deposited adjacent to the first ring-shaped layers of metallic material 150. The changing of the relative positions of the welding torches 110 and the ingot 100, and the depositing of ring-shaped layers of metallic material may be successively repeated until the circumferential surface 170 of the alloy ingot 100 is substantially covered with metallic material, as illustrated in FIG. 2, for example.

In various embodiments, a metallic material layer may be deposited as a weld deposit onto at least a region of a surface of an ingot by moving at least one welding torch along a first region of a circumferential surface of a cylindrical ingot, in the direction of a long axis of the ingot. At least one welding torch may be moved along the first region of the circumferential surface of the cylindrical ingot, in a direction of the long axis of the ingot, while the cylindrical ingot is held stationary. Alternatively, at least one welding torch may be held stationary while the cylindrical ingot is moved in a direction of the long axis of the ingot and the first region of the circumferential surface of the cylindrical ingot passes beneath the at least one welding torch. At least one welding torch may deposit metallic material onto the first region of the circumferential surface of the ingot, parallel to the long axis of the ingot. In this manner, a layer of the metallic material may be deposited onto the circumferential surface of the ingot generally parallel to the long axis of the ingot.

After a layer of the metallic material is deposited onto the circumferential surface of the ingot, parallel to the long axis of the ingot, the cylindrical ingot may be re-positioned to move the deposited metallic material layer (and the corresponding region of the circumferential surface) away from at least one welding torch and to move a second or subsequent region of the circumferential surface toward at least one welding torch. After the cylindrical ingot is re-positioned in this way, additional metallic material may be deposited as a weld deposit onto the cylindrical surface of the ingot by moving at least one welding torch in a direction parallel to the long axis of the ingot along the second or subsequent region of the circumferential surface of the ingot.

At least one welding torch may be moved along the second or subsequent region of the circumferential surface of the cylindrical ingot, in a direction parallel to a long axis of the ingot, while the cylindrical ingot is held stationary. Alternatively, at least one welding torch may be held stationary while the cylindrical ingot is moved parallel to the long axis of the ingot and the second or subsequent region of the circumferential surface of the cylindrical ingot passes beneath at least one welding torch. At least one welding torch may deposit metallic material onto the second or subsequent region of the circumferential surface of the ingot. In this manner, an additional axial layer of the metallic material may be deposited onto the circumferential surface of the ingot generally parallel to the long axis of the ingot and adjacent to and in contact with a previously deposited layer of the metallic material that also was deposited generally parallel to the long axis of the ingot. In various embodiments, both the position of at least one welding torch and the ingot may be moved so that the position of the at least one welding torch relative to the circumferential surface of the ingot is changed.

The relative re-positioning of the cylindrical ingot and at least one welding torch and the depositing of layers of metallic material on the ingot's circumferential surface in directions parallel to a long axis of the ingot may be successively repeated until the circumferential surface of the alloy ingot is substantially covered with metallic material. In various embodiments, welding operation parameters, welding torch positioning, and ingot positioning may be predetermined and/or actively controlled to form a uniform metallic material layer over at least a region of a surface of an alloy ingot.

Figure 5A:
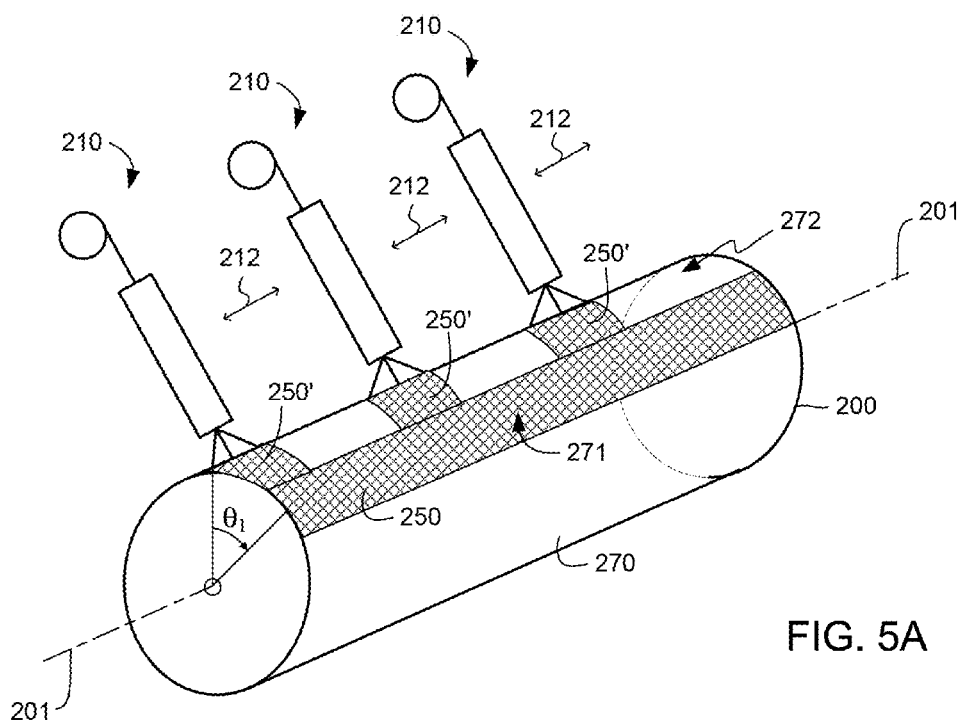
FIGS. 5A-5D are perspective views illustrating another method of depositing metallic material as weld deposits onto a circumferential surface of an ingot.
Figure 5B:
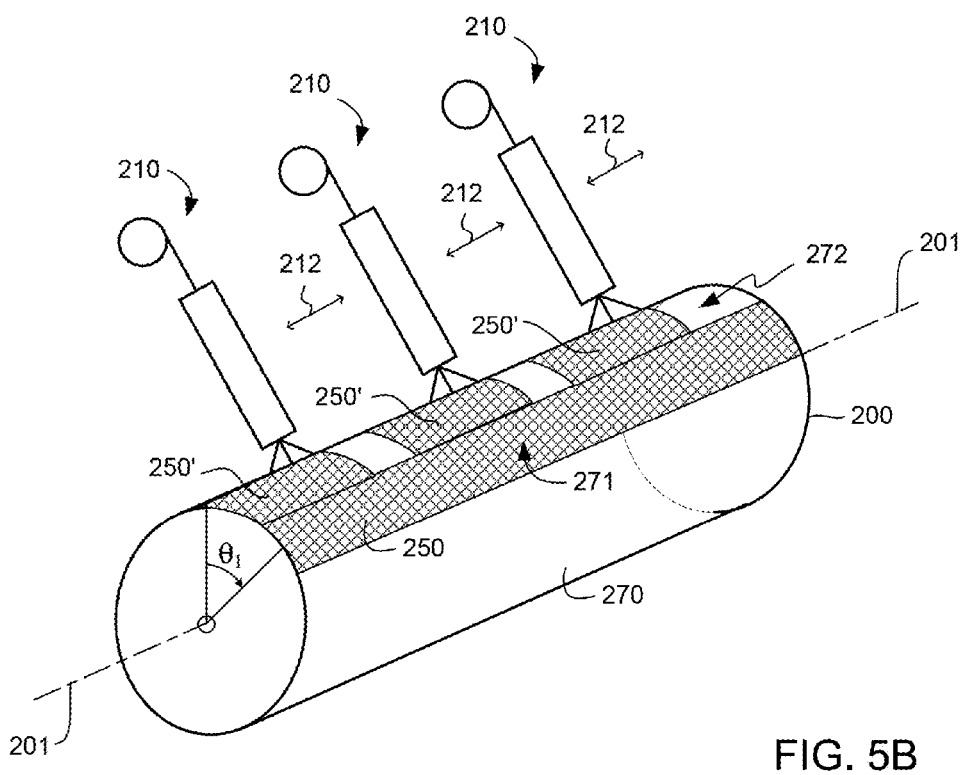
Figure 5C:
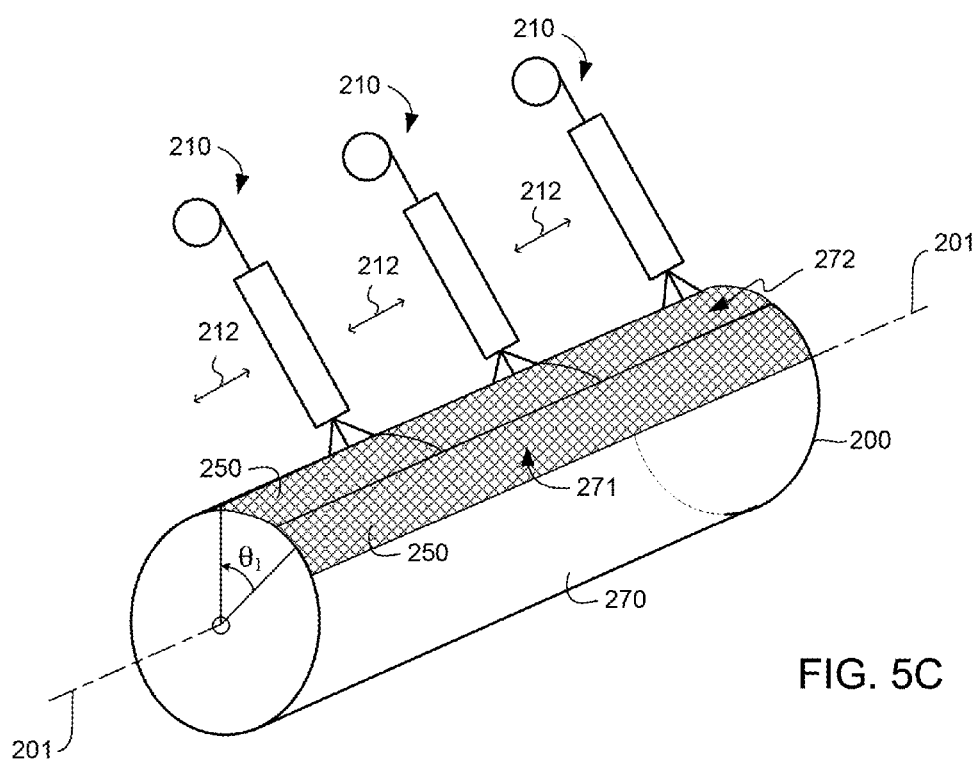

FIGS. 5A-5D collectively illustrate an embodiment of the deposition of metallic material as weld deposits onto at least a region of a surface of an alloy ingot. Referring to FIG. 5A, alloy ingot 200 is shown having a long axis 201 and a circumferential surface 270. A layer of metallic material 250 is shown deposited onto region 271 of the circumferential surface 250 of the ingot 200, positioned in a direction parallel to long axis 201. Welding torches 210 deposit additional metallic material as weld deposits 250' onto the region 272 of circumferential surface 270 as the welding torches 210 move along region 272 in a direction parallel to long axis 201, as indicated by arrows 212. The welding torches 210 move as indicated by arrows 212 until a layer of metallic material 250 is deposited along generally the entire length of ingot 200 in region 272 of the circumferential surface 270 (FIG. 5C).

Figure 5D:
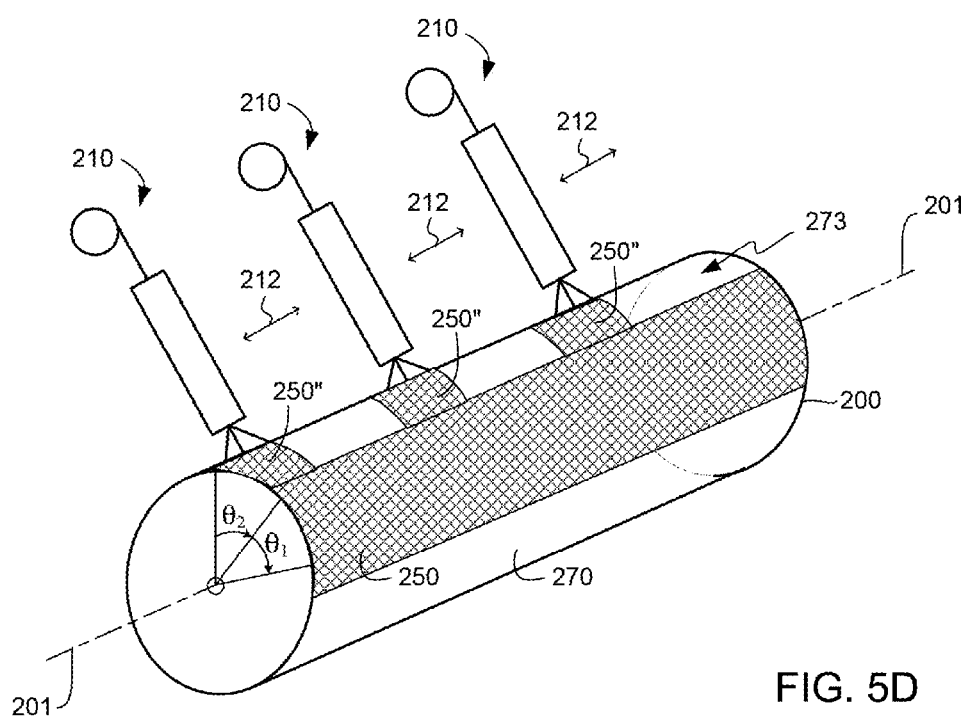

As shown in FIGS. 5C and 5D, after a layer of metallic material 250 is deposited in region 272, the ingot 200 is re-positioned to move the metallic material layer 250 (and the region 272) away from the welding torches 210 and to move a region 273 of the circumferential surface 270 toward the welding torches 210. The ingot 200 is re-positioned by rotating the ingot 200 through a predetermined index angle, indicated by the Greek letter theta (θ) in FIGS. 5A-5D.

As shown in FIG. 5D, after the ingot 200 is re-positioned, another layer of metallic material is deposited as weld deposits 250" onto the region 273 of the cylindrical surface 270 of the ingot 200 by moving the welding torches 210 along the region 273 of the circumferential surface 270 of the cylindrical ingot 200 in a direction parallel to long axis 201, as indicated by arrows 212. In this manner, additional layers of metallic material 250 are formed adjacent to each other and in contact around the circumferential surface 270 of the ingot 200. A first layer of metallic material was deposited onto region 271 of the circumferential surface 270. The alloy ingot 200 was then rotated through a predetermined index angle $\theta_1$. A second layer of metallic material was deposited onto region 272 of the circumferential surface 270. The alloy ingot was then rotated through a predetermined index angle $\theta_2$. A third layer is shown being deposited onto region 273 of the circumferential surface 270 in FIG. 4D in a direction parallel to long axis 201. The re-positioning of the ingot 200, movement of the welding torches 210, and deposition of layers of metallic material may be successively repeated until the circumferential surface 270 of the alloy ingot 200 is substantially covered with metallic material, as illustrated in FIG. 2, for example.

FIGS. 5A-5D show welding torches 210 moving along regions (271, 272, 273) of the circumferential surface 270 of the ingot 200 in direction parallel to long axis 201, indicated by arrows 212, while the ingot 200 is held stationary. Alternatively, the welding torches 210 may be held stationary and the ingot 200 may be moved in the direction of long axis 201 so that regions (271, 272, 273) of the circumferential surface 270 of the ingot 200 pass beneath the stationary welding torches 210. The welding torches 210 may deposit layers of metallic material 250 onto the regions (271, 272, 273) of the circumferential surface 270 of the ingot 200. In this manner, additional layers of the metallic material may be deposited onto the circumferential surface 270 of the ingot 200 generally parallel to the long axis 201 of the ingot 200 and adjacent to each other until the ingot 200 is substantially covered with metallic material, as illustrated in FIG. 2, for example.

In various embodiments, the metallic material layer may be deposited as a weld deposit onto a surface of an ingot by rotating the ingot about a long axis of the ingot and depositing the metallic material as a weld deposit onto a circumferential surface of the rotating ingot. The metallic material layer may be deposited using at least one moving welding torch. At least one welding torch may move parallel to the long axis of the ingot and deposits the metallic material onto the surface of the ingot as the ingot rotates. In this manner, a deposit of metallic material may be deposited in a helical fashion onto the circumferential surface of the cylindrical ingot as the ingot rotates and at least one welding torch moves.

Figure 6A:
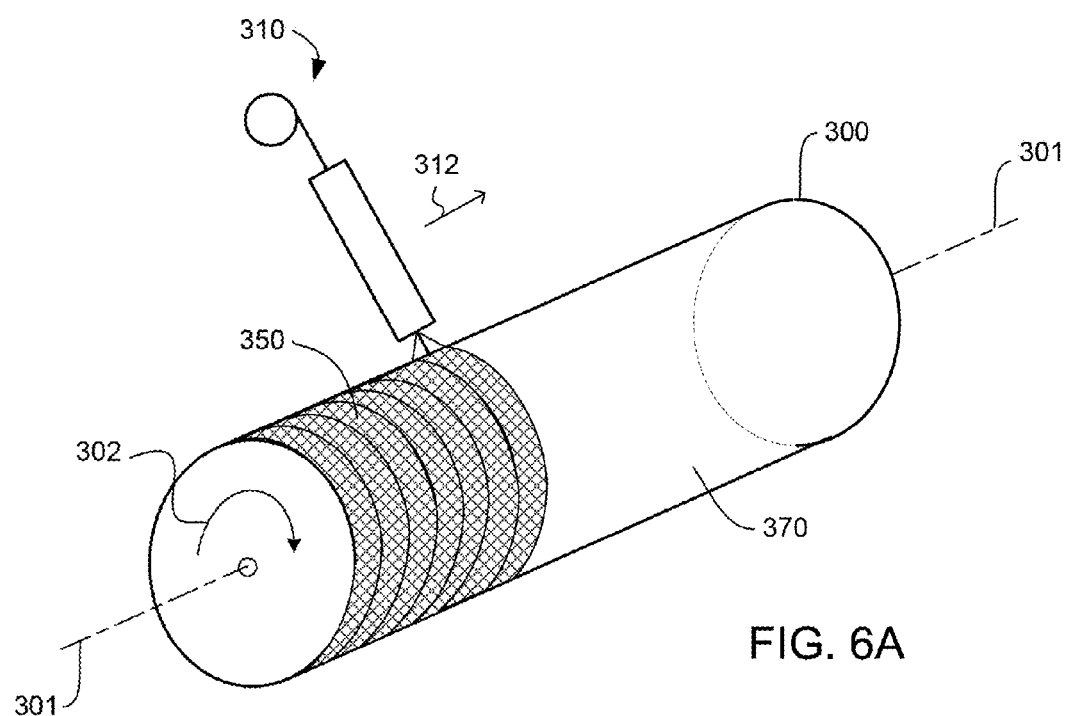
FIG. 6A is a perspective view illustrating another embodiment of a method of depositing metallic material as a weld deposit onto a circumferential surface of an ingot.
Figure 6B:
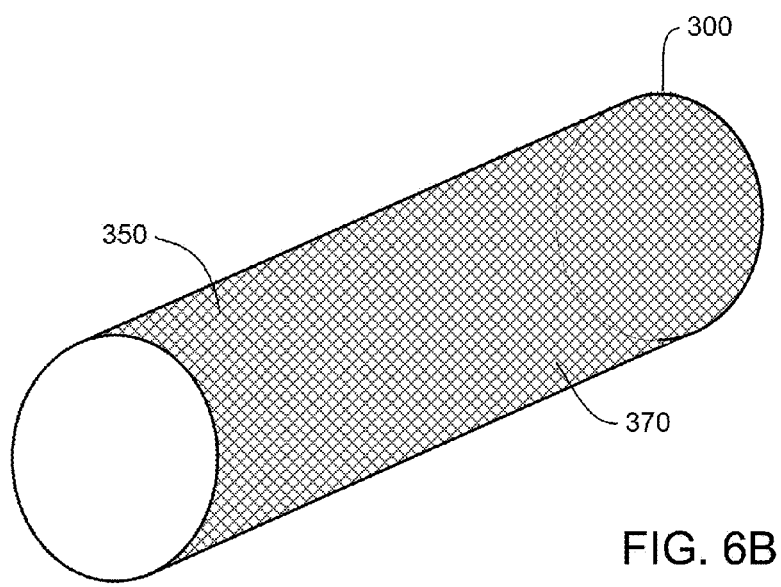
FIG. 6B is a perspective view of the ingot shown in FIG. 6A and having a metallic material layer deposited as a weld deposit over the entire circumferential surface of the ingot.

FIG. 6A illustrates the deposition of metallic material as a weld deposit onto at least a region of a surface of an alloy ingot. Alloy ingot 300 is shown having a long axis 301 and a circumferential surface 370. A deposit of metallic material 350 is shown deposited in a helical fashion onto the circumferential surface 370 of the ingot 300. Welding torch 310 deposits the metallic material layer 350 onto the circumferential surface 370 as the welding torch 310 moves parallel to long axis 301, as indicated by arrow 312, while the ingot 300 simultaneously rotates about long axis 301, as indicated by arrow 302. The welding torch 310 moves as indicated by arrow 312 and the ingot 300 rotates as indicated by arrow 302 until a layer of metallic material 350 is deposited along generally the entire circumferential surface 370 (FIG. 6B).

An alloy ingot including a metallic material layer deposited onto at least a region of a surface of the alloy ingot may be hot worked by applying force to the alloy ingot. Force may be applied to an alloy ingot in at least one region of at least one surface of the alloy ingot having a metallic material layer deposited onto at least one region. In this manner, force may be applied to an ingot by applying the force to the metallic material layer deposited onto the ingot. In various embodiments, a hot working operation may comprise a forging operation and/or an extrusion operation. For example, an alloy ingot having a metallic material layer deposited onto at least a region of a surface of the alloy ingot may be upset forged and/or draw forged.

An upset-and-draw forging operation may comprise one or more sequences of an upset forging operation and one or more sequences of a draw forging operation. During an upset operation, the end surfaces of an ingot may be in contact with forging dies that apply force to the ingot that compresses the length of the ingot and increases the cross-section of the ingot. During a draw operation, the side surfaces (e.g., the circumferential surface of a cylindrical ingot) may be in contact with forging dies that apply force to the ingot that compresses the cross-section of the ingot and increases the length of the ingot.

FIGS. 7A and 7C illustrate an upset forging operation. Forging dies 480/480' apply force to the opposed ends of an ingot 400/400'. The force is applied generally parallel to the long axis 401/401' of the ingot 400/400', as indicated by arrows 485/485'. FIG. 7A shows an ingot 400 without a deposited metallic material layer on opposed ends of the ingot 400. FIG. 7C shows an ingot 400' including metallic material layers 450 deposited onto the opposed ends of the ingot 400'. The ends of the ingot 400 are in contact with the forging dies 480 (FIG. 7A). The metallic material layers 450 are in contact with the forging dies 480' (FIG. 7C).

FIGS. 7B and 7D illustrate a die-contacting surface of each of the ingots 400 and 400' after upset forging as illustrated in FIGS. 7A and 7C, respectively. As shown in FIG. 7B, the die-contacting surface 490 of the ingot 400 exhibits surface cracking. As shown in FIG. 7D, the die-contacting surface 490' of the ingot 400', which includes metallic material layer 450, does not exhibit surface cracking. The deposited metallic material layer 450 reduces the incidence of surface cracking in a forged alloy ingot relative to an otherwise identical forged alloy ingot lacking such a metallic material layer.

Figure 8A:
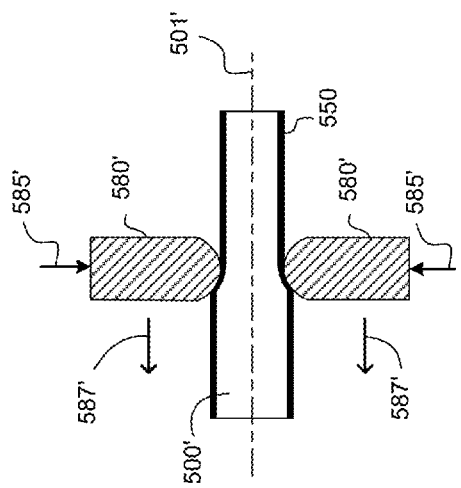
FIG. 8A is a side cross-sectional view of an ingot in a draw forging operation.
Figure 8B:
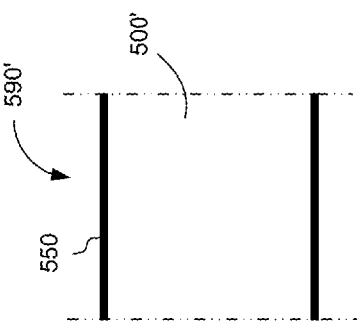
FIG. 8B is an expanded partial side cross-sectional view of the ingot shown in FIG. 8A after draw forging.
Figure 8C:
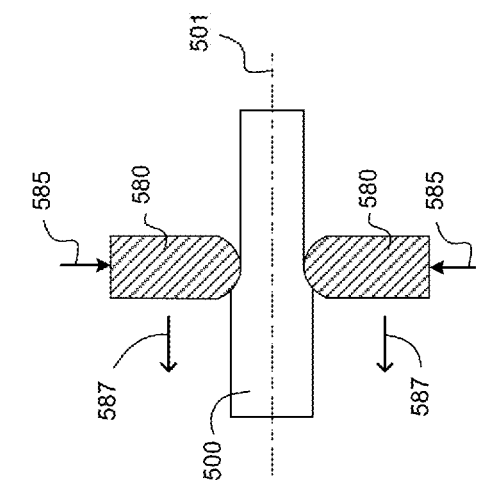
FIG. 8C is a side cross-sectional view of an ingot in a draw forging operation and having a metallic material layer deposited onto the circumferential surface of the ingot.

FIGS. 8A and 8C illustrate a draw forging operation. Forging dies 580/580' apply force to an ingot 500/500'. The force is applied generally perpendicular to the long axis 501/501' of the ingot 500/500', as indicated by arrows 585/585'. The forging dies 580/580' apply force to the ingot 500/500' along generally the entire length of the ingot 500/500' by moving generally parallel to the long axis 501/501' of the ingot 500/500', as indicated by arrows 587/587'. FIG. 8A shows an ingot 500 without a metallic material layer. FIG. 8C shows an ingot 500' having a metallic material layer 550 deposited onto a circumferential surface of the ingot 500'. The circumferential surface of the ingot 500 is in contact with the forging dies 580 (FIG. 8A). The metallic material layer 550 is in contact with the forging dies 580' (FIG. 8C).

Figure 8D:
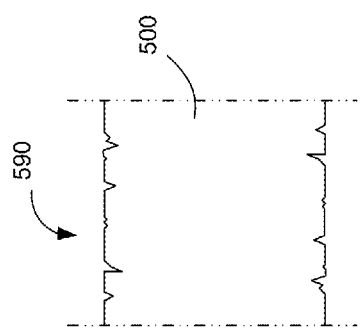
FIG. 8D is an expanded partial side cross-sectional view of the ingot shown in FIG. 8C after draw forging.

FIGS. 8B and 8D illustrate the die-contacting surfaces of the ingots 500 and 500' after draw forging as illustrated in FIGS. 8A and 8C, respectively. As shown in FIG. 8B, the die-contacting surface 590 of the ingot 500 exhibits surface cracking. As shown in FIG. 8D, the die-contacting surface 590' of the ingot 500', which includes metallic material layer 550, does not exhibit surface cracking. The deposited metallic material layer 550 reduces the incidence of surface cracking in a forged alloy ingot relative to an otherwise identical forged alloy ingot lacking such a metallic material layer.

In various embodiments, an ingot having a metallic material layer deposited onto at least a region of a surface of the ingot may be subjected to one or more upset-and-draw forging operations. For example, in a triple upset-and-draw forging operation, an ingot may be first upset forged and then draw forged. The upset and draw sequence may be repeated twice more for a total of three sequential upset and draw forging operations. One or more of the die-contacting surfaces of the ingot may have a metallic material layer deposited onto the die-contacting surfaces of the ingot before the ingot is forged.

In various embodiments, an ingot having a metallic material layer deposited onto at least a region of a surface of the ingot may be subjected to one or more extrusion operations. For example, in an extrusion operation, a cylindrical ingot may be forced through a circular die, thereby decreasing the diameter and increasing the length of the ingot. One or more of the die-contacting surfaces of the ingot may have a metallic material layer deposited onto die-contacting surfaces of the ingot before the ingot is extruded.

In various embodiments, the methods and processes described herein may be used to produce a wrought billet from a cast, consolidated, or spray formed ingot. The forge conversion or extrusion conversion of an ingot to a billet or other worked article may produce a finer grain structure in the article as compared to the former ingot. The methods and processes described herein may improve the yield of forged or extruded products (such as, for example, billets) from alloy ingots because the metallic material layer may reduce the incidence of surface cracking of the ingot during the forging and/or extrusion operations. For example, it has been observed that a relatively more ductile metallic material layer deposited onto at least a region of a surface of a relatively less ductile alloy ingot may more readily tolerate the strain induced by working dies. It also has been observed that a metallic material layer deposited onto at least a region of a surface of an alloy ingot may also more readily tolerate the temperature differential between the working dies and the ingot during hot working. In this manner, it has been observed that a deposited metallic material layer may exhibit zero or minor surface cracking while surface crack initiation is prevented or reduced in the underlying ingot during working.

In various embodiments, after hot working, at least a portion of a deposited metallic material layer may be removed from the product formed from the ingot during the hot working. For example, a grinding, peeling, and/or turning operation may be used to remove at least a portion of the metallic material layer. In various embodiments, at least a portion of a deposited metallic material layer may be removed from a billet formed by working an ingot by peeling (lathe-turning) and/or grinding the billet.

In various embodiments, ingots having a deposited metallic material layer may be hot worked to form products that may be used to fabricate various articles. For example, the processes described herein may be used to form nickel base, iron base, nickel-iron base, or cobalt base alloy or superalloy billets. Billets or other products formed from hot worked ingots may be used to fabricate articles including, but not limited to, turbine components, such as, for example, disks and rings for turbine engines and various land based turbines. Other articles fabricated from ingots processed according to various embodiments described herein may include, but are not limited to, valves, engine components, shafts, and fasteners.

Embodiments disclosed herein are also directed to an ingot processing system and an ingot processing apparatus. The ingot processing system and apparatus may comprise an ingot positioning apparatus and a welding apparatus. The ingot positioning apparatus may comprise an ingot rotating apparatus configured to rotate an ingot about a long axis of the ingot. The welding apparatus may be configured to deposit a metallic material layer as a weld deposit onto at least a region of a surface of an ingot.

In various embodiments, the ingot rotating apparatus may comprise a lathe configured to rotate an ingot about the long axis of the ingot. The ingot rotating apparatus may rotate the ingot continuously through one or more full rotations, or the ingot rotating device may discontinuously rotate the ingot sequentially through predetermined index angles, depending, for example, upon the configuration of the welding apparatus.

The welding apparatus may comprise at least one welding torch, such as, for example, a wire-fed MIG welding torch. At least one welding torch may be configured to deposit a layer of a metallic material as a weld deposit onto at least a region of a surface of an ingot. At least one welding torch may be configured to deposit a metallic material layer as a weld deposit onto at least a region of an end surface of an ingot. At least one welding torch may be configured to deposit a metallic material layer as a weld deposit onto at least a region of a circumferential surface of a cylindrical ingot. At least one welding torch may be configured to deposit metallic material onto the top of the circumferential surface of a cylindrical ingot. In this manner, gravity effects on a deposited weld bead may be reduced or eliminated.

In various embodiments, at least one welding torch may be a MIG welding torch. At least one welding torch may have a wire feed. At least one welding torch may be positioned a predetermined distance from a surface of an ingot. At least one welding torch may be configured with a predetermined wire feed rate, a predetermined wire voltage, and/or a predetermined inert gas purge flow rate. The torch-ingot surface distance, wire feed rate, voltage, inert gas purge flow rate, and/or various other welding operation parameters may be predetermined so that a metallic material layer is uniformly weld deposited onto the ingot. The identity of various other welding operation parameters may depend upon the particular type of welding operation utilized (e.g., MIG, TIG, etc.). In various embodiments, the heat input (e.g., energy per unit length) used in the particular welding operation may be maintained substantially uniform over the surface of the ingot onto which the metallic material is weld deposited. In this manner, weld-associated cracking of the underlying ingot surface may be reduced or eliminated, and the quality of the metallurgical bond between the underlying ingot and the weld deposit may be enhanced. In various embodiments, the heat input to the ingot during a welding operation may be minimized.

The welding apparatus may comprise one welding torch, a linear array of two or more welding torches, or a two- or three-dimensional array of three or more welding torches. For example, FIGS. 4A-4D, 5A-5D show a linear array of three welding torches. FIG. 6A shows one welding torch. The number and configuration of the welding torches comprising the welding apparatus may vary depending upon the particular implementation of the described ingot processing methods, systems, and apparatuses.

In various embodiments, the ingot processing system may comprise a control system. The control system may be configured to move and position the welding apparatus in conjunction with the ingot positioning apparatus to uniformly deposit a metallic material layer onto at least a region of a surface of the ingot. The control system may control the torch-surface distance, welding operation parameters, the movement and position of at least one welding torch relative to an ingot surface, and/or the movement and positioning of an ingot. For example, the control system may be configured to move at least one welding torch in a generally linear manner parallel to the long axis of an ingot and along a region of the circumferential surface of the ingot parallel to the long axis. The control system may also be configured to position at least one welding torch to deposit metallic material as a weld deposit onto opposed end surfaces of an ingot.

In various embodiments, the control system may be configured to control at least one welding torch to uniformly deposit the metallic material onto a rough surface of the ingot. For example, in various embodiments, the wire feed rate of a consumable electrode in a MIG welding torch, the voltage of the wire electrode, the torch-ingot surface distance, and the torch movement/positioning may be actively controlled to deliver a stable arc over a rotating or stationary ingot. In this manner, a substantially uniform layer of metallic material may be deposited onto the ingot.

The control system may be configured to automate the deposition of a metallic material layer as a weld deposit onto at least one end of an alloy ingot. The control system may be configured to automate the deposition of a metallic material layer as a weld deposit onto a circumferential surface of a cylindrical alloy ingot.

The ingot processing system may be configured to deposit metallic material as a weld deposit onto a first region of a circumferential surface of a rotating cylindrical ingot using at least one stationary welding torch. In this manner, the ingot processing system may deposit a ring-shaped layer of the metallic material around the circumferential surface of the cylindrical ingot. The ingot processing system may be configured to re-position at least one welding torch adjacent to a deposited ring-shaped layer of the metallic material after a rotating cylindrical ingot proceeds through at least one rotation. The ingot processing system may be configured to deposit the metallic material as a weld deposit onto a second or subsequent region of the circumferential surface of the rotating cylindrical ingot using at least one re-positioned stationary welding torch. In this manner, the ingot processing system may deposit another ring-shaped layer of the metallic material onto the circumferential surface of the cylindrical ingot. The ingot processing system may be configured to repeat the re-positioning of at least one welding torch and the deposition of ring-shaped metallic material layers in an automated manner until the circumferential surface of a cylindrical ingot is substantially covered with a metallic material layer.

The ingot processing system may be configured to deposit metallic material as a weld deposit onto a first region of a circumferential surface of a stationary ingot along a direction parallel to a long axis of the ingot using at least one welding torch configured to move parallel to the long axis of the ingot and along the first region. In this manner, the ingot processing system may deposit a layer of the metallic material onto the first region of the circumferential surface of the cylindrical ingot. The ingot processing system may be configured to re-position the cylindrical ingot to move the first region of the circumferential surface away from at least one welding torch and to move a second region of the circumferential surface toward at least one welding torch. For example, the ingot may be rotated through a predetermined index angle by the ingot rotating device.

The ingot processing system may be configured to deposit metallic material as a weld deposit onto a second or subsequent region of the circumferential surface of the stationary ingot along a direction parallel to a long axis of the ingot using at least one welding torch configured to move parallel to the long axis of the ingot and along the second region. In this manner, the ingot processing system may deposit a layer of the metallic material onto the second region of the circumferential surface of the cylindrical ingot. The ingot processing system may be configured to repeat the re-positioning of the ingot and the depositing of metallic material layers along a direction parallel to a long axis of an ingot in an automated manner until the circumferential surface of a cylindrical ingot is substantially covered with a metallic material layer.

The ingot processing system may be configured to deposit metallic material as a weld deposit onto a surface of an ingot by rotating the ingot about a long axis of the ingot and simultaneously moving the welding torch parallel to a long axis of the ingot. The metallic material layer may be deposited using at least one moving welding torch under the control of the control system. In this manner, a deposit of metallic material may be deposited in a helical fashion onto the circumferential surface of the cylindrical ingot as the ingot rotates about the long axis and as at least one welding torch moves parallel to the long axis.

The illustrative and non-limiting examples that follow are intended to further describe various non-limiting embodiments without restricting the scope of the embodiments. Persons having ordinary skill in the art will appreciate that variations of the Examples are possible within the scope of the invention as defined solely by the claims. All parts and percents are by weight unless otherwise indicated.

EXAMPLES

Example 1

Figure 9A:
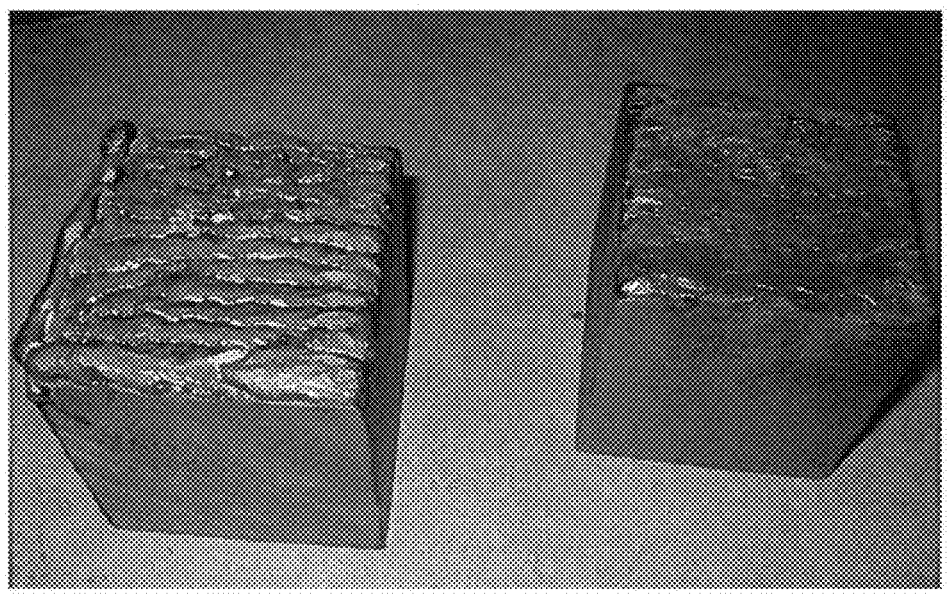
FIG. 9A is a photograph of two 3-inch alloy cubes, each having a metallic material layer deposited by a welding operation on the top surface of the cube (as oriented in the photograph)
Figure 9B:
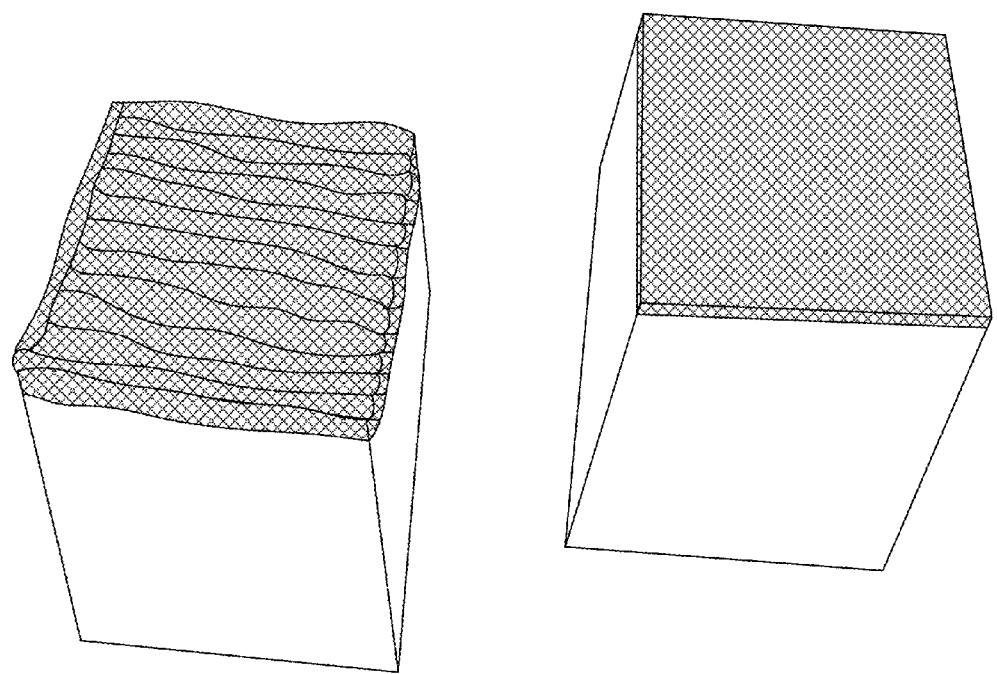
FIG. 9B is a schematic diagram of the photograph shown in FIG. 9A.

Three-inch cubes of Rene 88™ alloy were used in a hot working operation. The cubes were randomly cut from scrap portions of a Rene 88™ billet. The cubes were heat treated at 2100° F. for 4 hours to increase the grain size of the alloy cubes to match the workability characteristics of a Rene 88™ ingot. One face surface of each cube was conditioned by grinding on a disk grinder followed by sanding with a belt sander. A TechAlloy 606™ alloy layer was deposited as a weld deposit onto the conditioned face surface of each cube using MIG welding (0.045 inch diameter TechAlloy 606 wire, 220 inch-per-minute, 18V wire voltage, 50 cubic feet per minute argon purge). The weld deposited TechAlloy 606™ alloy layer was allowed to fully solidify and cool to room temperature. FIG. 9A is a photograph of two 3-inch cubes of Rene 88™ alloy each having TechAlloy 606™ alloy layers weld deposited onto the top surfaces as oriented in the photograph.

A Rene 88™ alloy cube having a TechAlloy 606™ alloy layer was heated to 2000° F. over a one-hour period and press forged at temperature. The face surface having the TechAlloy 606™ alloy layer was placed in contact with the bottom die and the opposite face surface, which lacked a TechAlloy 606™ alloy layer, was placed in contact with the upper die. The 3-inch cube was press forged to a 1-inch pancake using an approximately 1-inch-per-second strain rate.

Figure 10A:
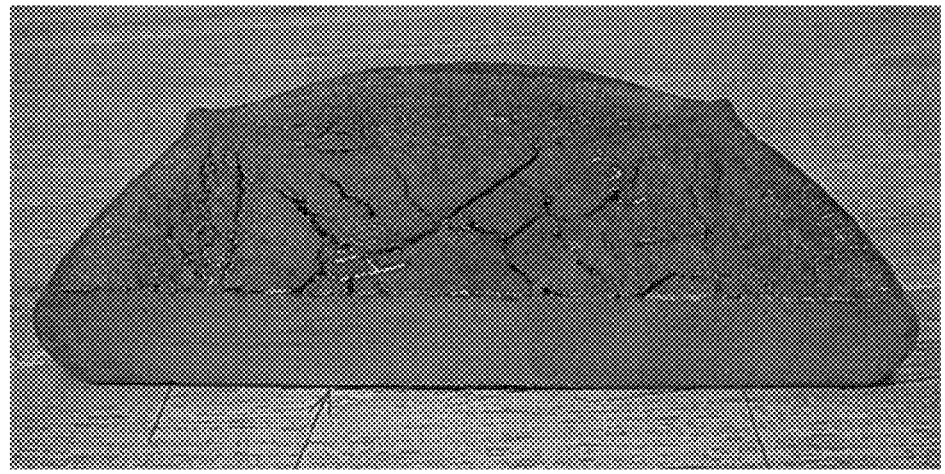
FIGS. 10A and 10B are photographs of the two die-contacting surfaces of a 1-inch pancake that was press forged from a 3-inch alloy cube having a metallic material layer deposited by a welding operation onto one die-contacting surface of the alloy cube.
Figure 10B:
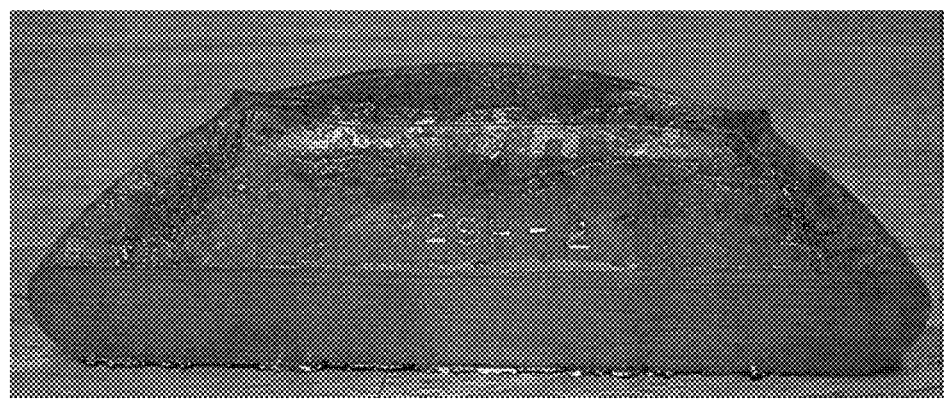
Figure 10C:
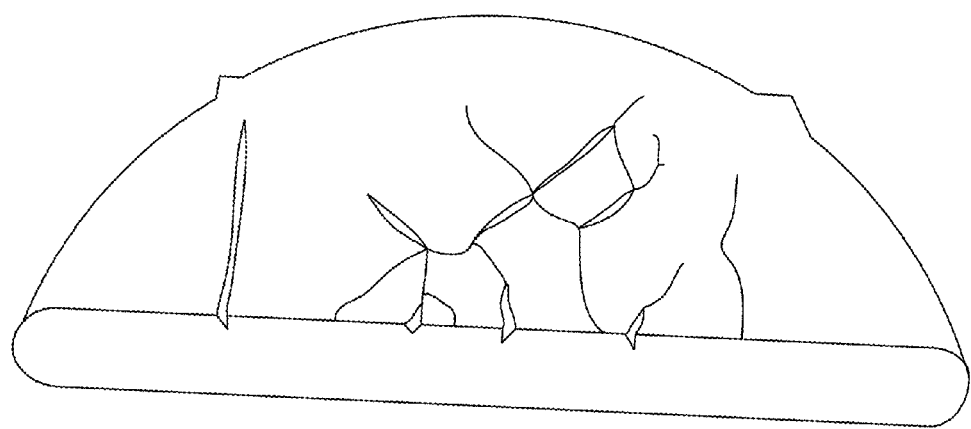
FIGS. 10C and 10D are schematic diagrams of the photographs respectively shown in FIGS. 10A and 10B.
Figure 10D:
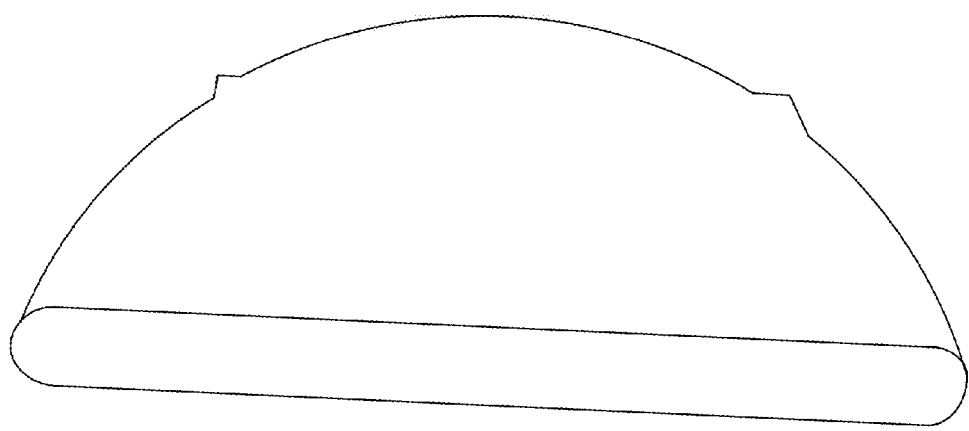

FIGS. 10A and 10B are photographs of opposing sides of a 1-inch pancake pressed forged from a 3-inch cube. FIG. 10A shows the non-layered side surface of the pancake, and FIG. 10B shows the side surface having the TechAlloy 606™ alloy layer. The crack sensitivity of the Rene 88™ alloy is visible on the forged, non-layered surface shown in FIG. 10A. Surface cracking is clearly visible on the surface lacking a TechAlloy 606™ alloy layer as shown in FIG. 10A. As shown in FIG. 10B, the TechAlloy 606™ alloy layer substantially reduced the incidence of surface cracking of the alloy during the forging.

Figure 11A:
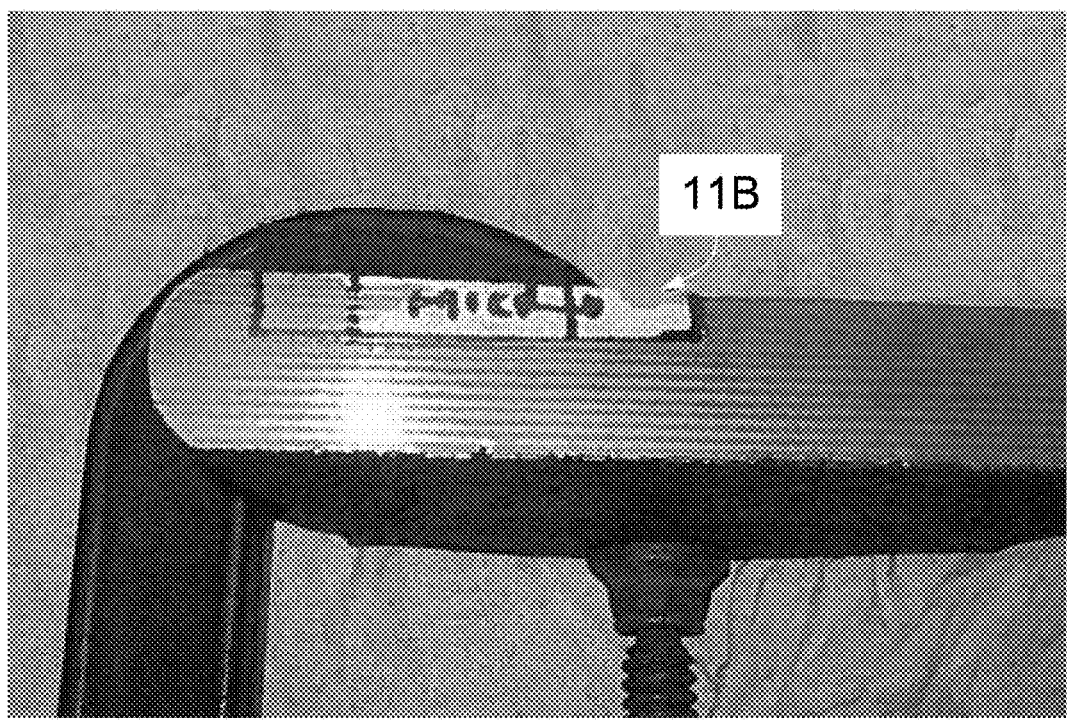
FIG. 11A is a photograph of a sectioned 1-inch pancake that was press forged from a 3-inch alloy cube having a metallic material layer deposited by a welding operation onto one die-contacting surface of the alloy cube (the top surface as oriented in the photograph)
Figure 11B:
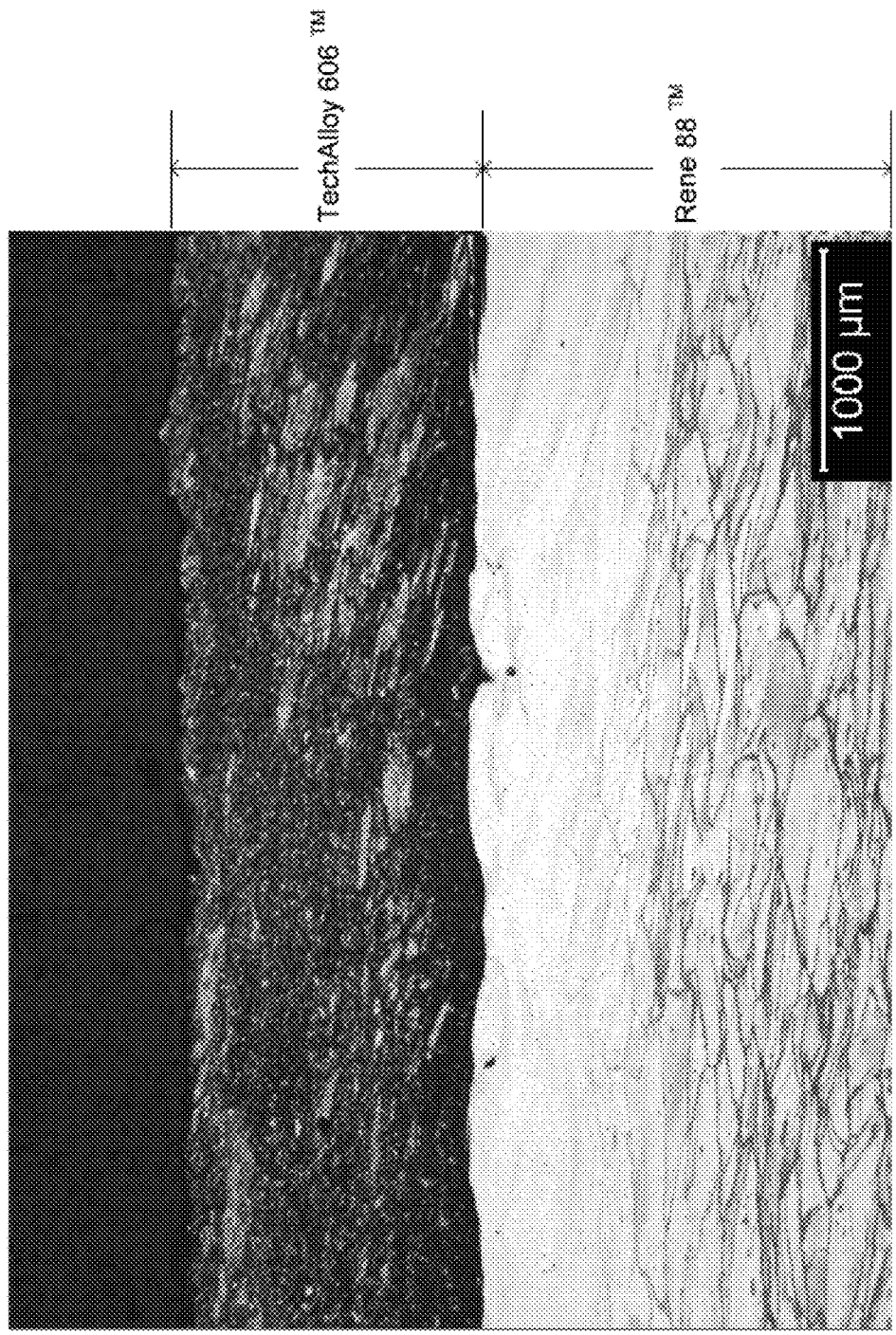
FIG. 11B is a micrograph taken along the cross-section of the welded surface as indicated in FIG. 11A, and FIGS. 11C and 11D are schematic diagrams of the photographs respectively shown in FIGS. 11A and 11B.
Figure 11C:
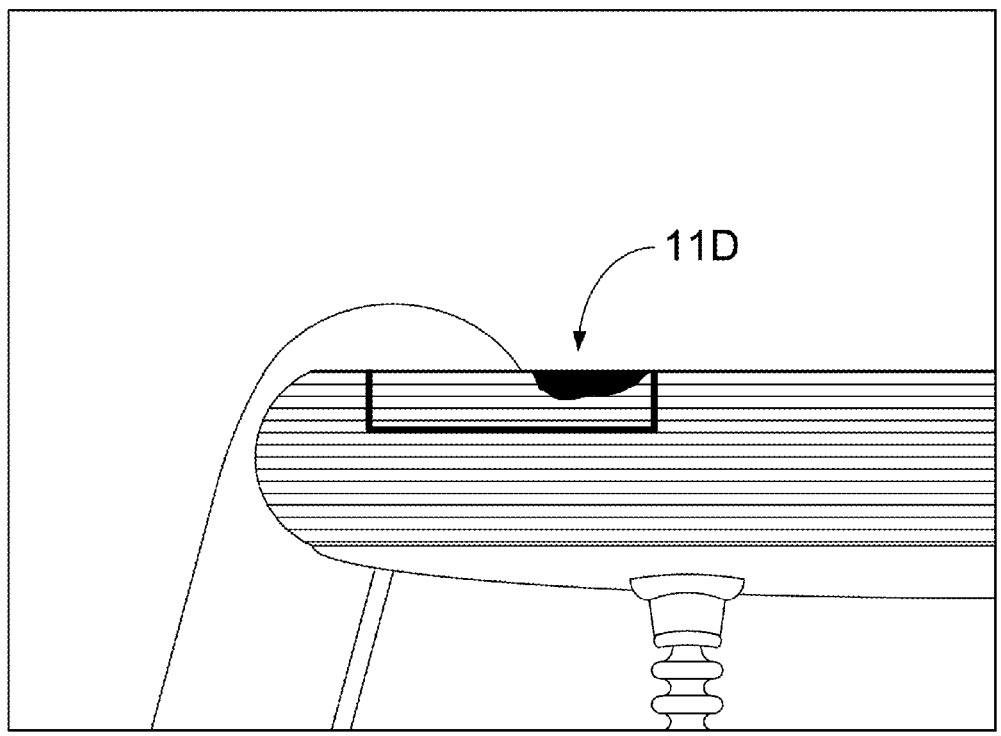
Figure 11D:
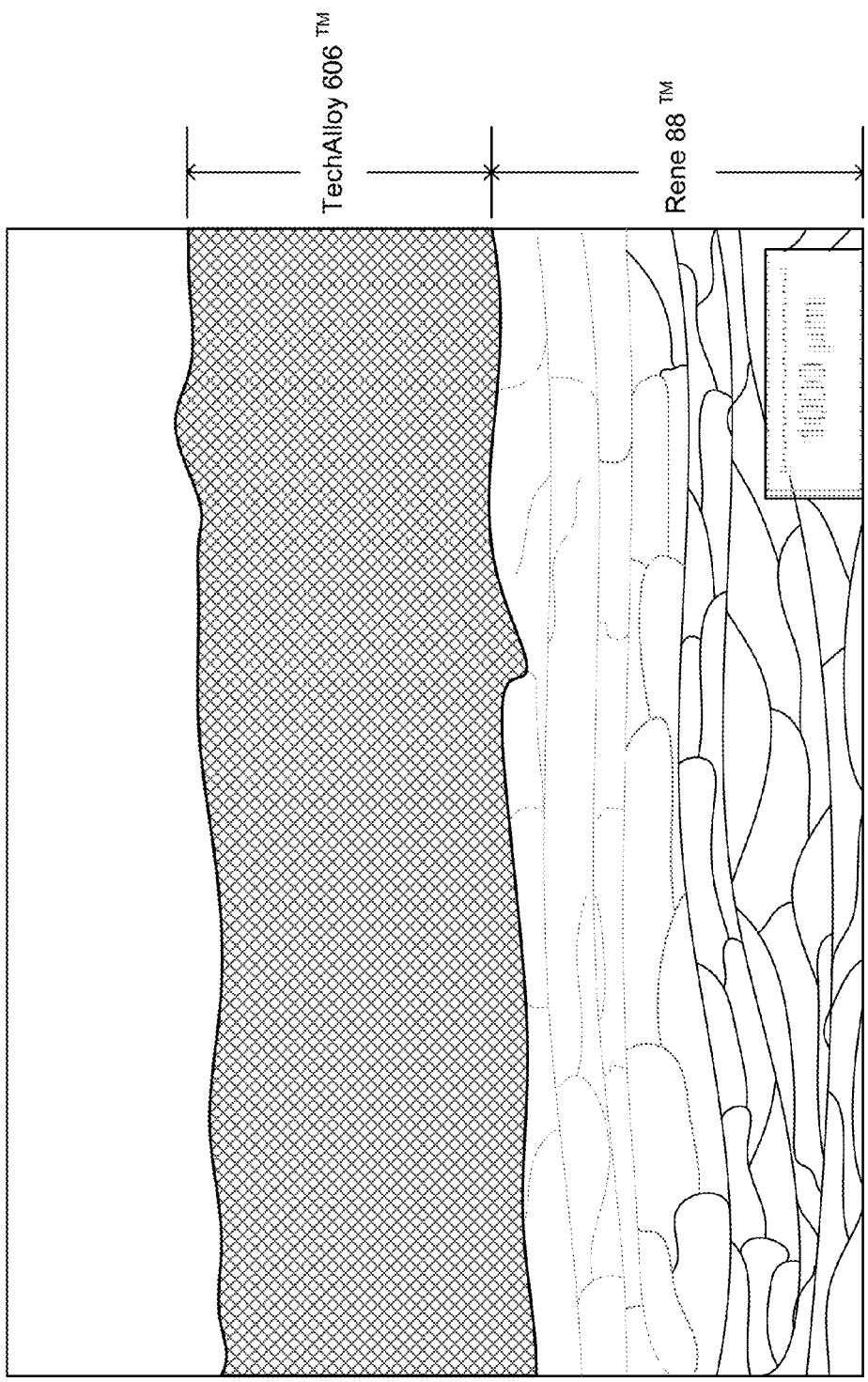

FIG. 11A is a photograph of a sectioned 1-inch pancake pressed forged from a 3-inch alloy cube as described above. The interface between the TechAlloy 606™ alloy layer and the underlying forged Rene 88™ was imaged using optical microscopy at a mid-radius location (labeled "11B" in FIG. 11A), which corresponded to the cross-section of the welded surface of the pancake (the top surface as oriented in the photograph). FIG. 11B is a micrograph taken at the mid-radius location as indicated in FIG. 11A.

As shown in FIG. 11B, a strong and uniform metallurgical bond was formed between the TechAlloy 606™ alloy layer and the underlying Rene 88™ The metallurgical bond withstood the press forging and no de-lamination or de-bonding was observed. The exposed surface of the TechAlloy 606™ alloy layer and the interface between the TechAlloy 606™ alloy layer and the underlying forged Rene 88™ are both substantially free of cracks. Removal of the TechAlloy 606™ alloy layer (e.g., by grinding) would reveal the underlying forged Rene 88™ substantially free of surface cracks.

The present disclosure has been written with reference to various exemplary, illustrative, and non-limiting embodiments. However, it will be recognized by persons having ordinary skill in the art that various substitutions, modifications, or combinations of any of the disclosed embodiments (or portions thereof) may be made without departing from the scope of the invention as defined solely by the claims. Thus, it is contemplated and understood that the present disclosure embraces additional embodiments not expressly set forth herein. Such embodiments may be obtained, for example, by combining, modifying, or reorganizing any of the disclosed steps, ingredients, constituents, components, elements, features, aspects, characteristics, limitations, and the like, of the embodiments described herein. Thus, this disclosure is not limited by the description of the various exemplary, illustrative, and non-limiting embodiments, but rather solely by the claims. In this manner, Applicants reserve the right to amend the claims during prosecution to add features as variously described herein.

What is claimed is:

1. An ingot processing method comprising:
   depositing a metallic material layer onto a curved circumferential surface of a cylindrical alloy ingot and at least one of two flat circular end surfaces of the cylindrical alloy ingot, the cylindrical alloy ingot comprising three outer surfaces comprising the two flat circular end surfaces and the curved circumferential surface intersecting and connecting the two flat circular end surfaces, wherein the metallic material is more ductile than the alloy, and
   wherein depositing the metallic material layer comprises depositing the metallic material layer as a weld deposit.

2. The ingot processing method of claim 1, further comprising hot working the alloy ingot, wherein the hot working comprises applying force onto the metallic material layer.

3. The ingot processing method of claim 2, wherein hot working the alloy ingot comprises at least one of a forging operation and an extrusion operation.

4. The ingot processing method of claim 2, wherein hot working the alloy ingot comprises an upset-and-draw forging operation comprising:
   upset forging the alloy ingot, wherein forging dies contact and apply force to the metallic material layer on one or both of the flat circular end surfaces to compress the ingot in length and expand the ingot in cross-section; and
   draw forging the upset forged alloy ingot, wherein forging dies contact and apply force to the metallic material layer on the curved circumferential surface to compress the ingot in cross-section and expand the ingot in length.

5. The ingot processing method of claim 2, further comprising removing the metallic material layer from the alloy ingot after hot working the alloy ingot.

6. The ingot processing method of claim 1, further comprising grinding or peeling the surface of the alloy ingot before depositing the metallic layer.

7. The ingot processing method of claim 1, wherein the alloy ingot comprises a material selected from the group consisting of a nickel base alloy, an iron base alloy, a nickel-iron base alloy, and a cobalt base alloy.

8. The ingot processing method of claim 1, wherein the alloy ingot comprises a nickel base superalloy.

9. The ingot processing method of claim 1, wherein the alloy ingot and the metallic material layer comprise the same base metal, the base metal selected from the group consisting of nickel, iron, and cobalt.

10. The ingot processing method of claim 1, wherein the alloy ingot comprises a nickel base superalloy and the metallic material layer comprises a nickel base weld alloy.

11. The ingot processing method of claim 1, wherein depositing the metallic material layer as a weld deposit comprises a welding operation selected from the group consisting of metal inert gas (MIG) welding, tungsten inert gas (TIG) welding, and plasma welding.

12. The ingot processing method of claim 1, wherein depositing the metallic material layer as a weld deposit comprises:
    rotating the cylindrical ingot; and
    depositing the metallic material as a weld deposit onto a first region of the curved circumferential surface of the rotating cylindrical ingot using at least one stationary welding torch, thereby depositing a ring-shaped layer of the metallic material onto the curved circumferential surface of the cylindrical ingot.

13. The ingot processing method of claim 12, further comprising:
    re-positioning at least one welding torch adjacent to a deposited ring-shaped layer of the metallic material after the rotating cylindrical ingot proceeds through at least one rotation; and
    depositing metallic material as a weld deposit onto a second region of the curved circumferential surface of the rotating cylindrical ingot using at least one re-positioned stationary welding torch.

14. The ingot processing method of claim 13, further comprising repeating the re-positioning step and the depositing step until the curved circumferential surface of the cylindrical ingot is substantially covered with the metallic material.

15. The ingot processing method of claim 1, wherein depositing the metallic material layer as a weld deposit comprises:
    moving at least one welding torch along a first region of the curved circumferential surface of the cylindrical ingot parallel to a long axis of the ingot, while holding the cylindrical ingot stationary, thereby depositing a layer of the metallic material as a weld deposit onto the first region of the curved circumferential surface of the cylindrical ingot;
    re-positioning the cylindrical ingot to move the first region of the curved circumferential surface away from at least one welding torch and to move a second region of the curved circumferential surface toward at least one welding torch; and
    moving at least one welding torch along the second region of the curved circumferential surface of the cylindrical ingot parallel to the long axis of the ingot, while holding the cylindrical ingot stationary, thereby depositing a layer of the metallic material as a weld deposit onto the second region of the curved circumferential surface of the cylindrical ingot.

16. The ingot processing method of claim 15, further comprising repeating the re-positioning step and the moving step until the curved circumferential surface of the ingot is substantially covered with the metallic material.

17. The ingot processing method of claim 1, further comprising providing the cylindrical alloy ingot using: a vacuum induction melting —vacuum arc remelting operation; or a vacuum induction melting —electroslag refining —vacuum arc remelting operation.

18. The ingot processing method of claim 1, wherein the metallic material layer is deposited onto the cylindrical alloy ingot using an ingot processing system comprising:
    an ingot rotating apparatus configured to rotate the cylindrical ingot about a long axis of the ingot; and a welding apparatus configured to deposit the metallic material layer as a weld deposit onto at least a region of the curved circumferential surface of the cylindrical alloy ingot.

19. The ingot processing method of claim 18, wherein the ingot rotating apparatus comprises a lathe configured to rotate the cylindrical alloy ingot about the long axis of the ingot; and wherein the welding apparatus comprises at least one MIG welding torch configured to deposit the metallic material layer as a weld deposit onto at least a region of the curved circumferential surface of the cylindrical alloy ingot.

20. An ingot processing method comprising:

depositing a metallic material layer onto a curved circumferential surface of a cylindrical alloy ingot and at least one of two flat circular end surfaces of the cylindrical alloy ingot, the cylindrical alloy ingot comprising three outer surfaces comprising the two flat circular end surfaces and the curved circumferential surface intersecting and connecting the two flat circular end surfaces, wherein the metallic material is more ductile than the alloy, wherein the metallic material layer comprises a thickness of at least 0.25 inches.

21. The ingot processing method of claim 1, wherein the metallic material layer comprises a thickness of 0.25 inches to 0.5 inches.

\* \* \* \* \*